United States Patent
Wang et al.

(10) Patent No.: US 11,310,729 B2
(45) Date of Patent: Apr. 19, 2022

(54) CELL SEARCH METHOD AND COMMUNICATIONS APPARATUS

(71) Applicant: HUAWEI TECHNOLOGIES CO., LTD., Shenzhen (CN)

(72) Inventors: Qi Wang, Shenzhen (CN); Ping Fang, Shenzhen (CN); Yong Cheng, Shenzhen (CN); Pengfei Xia, Shenzhen (CN); Wei Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 20 days.

(21) Appl. No.: 17/040,544

(22) PCT Filed: Apr. 12, 2019

(86) PCT No.: PCT/CN2019/082341
§ 371 (c)(1),
(2) Date: Sep. 23, 2020

(87) PCT Pub. No.: WO2019/196912
PCT Pub. Date: Oct. 17, 2019

(65) Prior Publication Data
US 2021/0076314 A1 Mar. 11, 2021

(30) Foreign Application Priority Data

Apr. 12, 2018 (CN) .................... 201810325541.X
Sep. 30, 2018 (CN) .................... 201811161363.8

(51) Int. Cl.
*H04W 48/16* (2009.01)
*H04B 17/26* (2015.01)
(Continued)

(52) U.S. Cl.
CPC ............ *H04W 48/16* (2013.01); *H04B 17/26* (2015.01); *H04W 4/14* (2013.01); *H04W 76/12* (2018.02)

(58) Field of Classification Search
CPC ....... H04W 48/16; H04W 76/12; H04W 4/14; H04B 17/26
See application file for complete search history.

(56) References Cited

U.S. PATENT DOCUMENTS

2009/0238114 A1* 9/2009 Deshpande .......... H04J 11/0069
370/328
2011/0105074 A1* 5/2011 Wu ....................... H04W 76/19
455/404.1
(Continued)

FOREIGN PATENT DOCUMENTS

| CN | 101600242 A | 12/2009 |
| CN | 101895949 A | 11/2010 |

(Continued)

OTHER PUBLICATIONS

3GPP TS 36.304 V14.6.0 (Mar. 2018), 3rd Generation Partnership Project; Technical Specification Group Radio Access Network; Evolved Universal Terrestrial Radio Access (E-UTRA); User Equipment (UE) procedures in idle mode (Release 14), total 50 pages.
(Continued)

*Primary Examiner* — Wayne H Cai

(57) ABSTRACT

A cell search method and a communications apparatus are provided. The method includes the following: before searching for a cell, a terminal device may determine, with reference to historical access information of another terminal device, whether there is a cell at the location, and adjust, based on a determining result, a value of a search parameter used to search for a cell. For example, if there is a cell, the terminal device may adjust the search parameter to accelerate a search. If there is no cell, the terminal device may perform no search, or adjust the search parameter to reduce an unnecessary cell search performed by the terminal device, so that power consumption of the terminal device can be reduced.

20 Claims, 12 Drawing Sheets

(51) Int. Cl.
*H04W 76/12* (2018.01)
*H04W 4/14* (2009.01)

(56) References Cited

U.S. PATENT DOCUMENTS

| | | |
|---|---|---|
| 2015/0156713 A1 | 6/2015 | Song et al. |
| 2016/0081046 A1 | 3/2016 | Li et al. |
| 2018/0027545 A1 | 1/2018 | Kato |

FOREIGN PATENT DOCUMENTS

| | | |
|---|---|---|
| CN | 105657791 A | 6/2016 |
| CN | 105704786 A | 6/2016 |
| CN | 105744599 A | 7/2016 |
| CN | 106162813 A | 11/2016 |
| CN | 106211126 A | 12/2016 |
| CN | 106714081 A | 5/2017 |
| CN | 106817671 A | 6/2017 |

OTHER PUBLICATIONS

Extended European Search Report dated Mar. 30, 2021 issued in European Application No. 19785433.4 (5 pages).

\* cited by examiner

| Location | Whether access succeeds |
|---|---|
| Location d | No |
| Location e | Yes |
| Location f | Yes |
| ... | ... |
|  |  |

Access fails at a location d; access succeeds at a location e, a carrier frequency of a reference signal of a macro cell A accessed at the location E is a carrier 2, and a PCI of the macro cell A is a PCI 2; and access succeeds at a location f, a carrier frequency of a reference signal of a small cell C accessed at the location F is a carrier 4, and a PCI of the small cell C is a PCI 4

FIG. 5A

| Location | Information about an accessed cell |
|---|---|
| Location d | |
| Location e | Carrier 2 and PCI 2 |
| Location f | Carrier 4 and PCI 4 |
| ... | ... |
| | |

FIG. 5B

CELL SEARCH METHOD AND COMMUNICATIONS APPARATUS

CROSS-REFERENCE TO RELATED APPLICATIONS

This application is a national stage of International Application No. PCT/CN2019/082341, filed on Apr. 12, 2019, which claims priority to Chinese Patent Application No. 201810325541.X, filed on Apr. 12, 2018 and Chinese Patent Application No. 201811161363.8, filed on Sep. 30, 2018. All of the aforementioned applications are hereby incorporated by reference in their entireties.

TECHNICAL FIELD

This application relates to the field of communications technologies, and in particular, to a cell search method and a communications apparatus.

BACKGROUND

In a next generation communications system, for example, a 5th generation (the 5th generation, 5G) mobile communications system, to ensure a stable connection between a terminal device and a core network (for example, a 5G core network), a plurality of types of base stations with different frequencies may be deployed, for example, a low-frequency base station and a high-frequency base station. Because the low-frequency base station has a larger coverage area than the high-frequency base station, when the terminal device accesses the core network, the terminal device may first access the low-frequency base station with a larger coverage area, so that a basic data service is provided by the low-frequency base station for the terminal device. Then, after finding the high-frequency base station with a smaller coverage area, the terminal device is handed over from the low-frequency base station to the high-frequency base station, to obtain a service with better quality from the high-frequency base station with a smaller coverage area.

Due to uncertainty and discontinuity of base station distribution, when accessing a base station, the terminal device needs to search for cells of base stations a plurality of times. This not only wastes time, but also increases power consumption.

SUMMARY

Embodiments provide a cell search method and a communications apparatus, to reduce time and power consumption that are required by a terminal device to perform cell search.

According to a first aspect, an embodiment of this application provides a cell search method. The method includes the following: Before searching for a cell at a first location, a first terminal first obtains first information. For example, the first terminal may obtain, from one or more second terminals near the first terminal in a short-distance communication manner, historical access information corresponding to each second terminal at the first location, and historical access information corresponding to the first location indicates whether there is a cell at the first location. In other words, the first information may include the historical access information corresponding to each second terminal at the first location. Then, the first terminal determines a value of a search parameter of the first terminal at the first location based on second information including the first information, and searches for a cell at the first location based on the value of the search parameter.

In the foregoing technical solution, before searching for a cell, a terminal device may determine, with reference to historical access information of another terminal device, whether there is a cell at the location, and adjust, based on a determining result, a value of a search parameter used to search for a cell. For example, if there is a cell, the terminal device may adjust the search parameter to accelerate a search. If there is no cell, the terminal device may perform no search, or adjust the search parameter to reduce an unnecessary cell search performed by the terminal device, so that power consumption of the terminal device can be reduced.

In one example design, the second information further includes historical access information that is stored by the first terminal and that corresponds to the first terminal at the first location.

In the foregoing technical solution, the terminal device may further determine, based on the historical access information of the terminal device at the first location, whether there is a cell at the first location. For example, when the terminal device obtains no historical access information corresponding to another terminal device at the first location, the terminal device may determine, based on the historical access information of the terminal device at the first location, whether there is a cell at the first location. Alternatively, the terminal device may determine, with reference to both historical access information corresponding to another terminal device at the first location and the historical access information of the terminal device at the first location, whether there is a cell at the first location. This can improve accuracy of determining, by the terminal device, whether there is a cell at the first location, so as to improve robustness of searching for a cell by the terminal device.

In one example design, the historical access information corresponding to the first location may include any one of the following four types of indication information. Details are as follows:

For a first type, the historical access information corresponding to the first location includes first indication information, and the first indication information is used to indicate that a cell is successfully accessed/found at the first location, or the first indication information is used to indicate that no cell is successfully accessed/found at the first location.

For a second type, the historical access information corresponding to the first location includes second indication information, and the second indication information is used to indicate that a cell is successfully accessed/found at the first location, and indicate one or more cells found at the first location.

For a third type, the historical access information corresponding to the first location includes third indication information, and the third indication information is used to indicate that a cell is successfully accessed/found at the first location, and indicate one or more cells successfully accessed at the first location.

For a fourth type, the historical access information corresponding to the first location includes fourth indication information, the fourth indication information is used to indicate that a cell is successfully accessed/found at the first location, and indicate one or more cells successfully accessed/found at the first location and related information of the one or more successfully accessed/found cells, and the related information of the cell includes a carrier frequency of the cell.

In the foregoing technical solution, whether there is a cell at the first location may be indicated in a plurality of manners, so that flexibility of searching for a cell by the terminal device can be improved.

In one example design, the search parameter includes at least one of a search carrier frequency parameter, a location change threshold parameter, a parameter of a maximum quantity of search times, and a search period parameter, and the first terminal searches for a cell based on a value of the search carrier frequency parameter; when a quantity of times of searching for a cell by the first terminal at a location is equal to a value of the parameter of the maximum quantity of search times, the first terminal determines that there is no cell at the location; when the first terminal is displaced and a displacement amount is greater than or equal to a value of the location change threshold parameter, the first terminal re-searches for a cell at a location of the first terminal after the displacement and re-collects statistics about a quantity of cell search times; and when the first terminal searches for a cell at a location, a time interval between a moment at which a previous search ends and a moment at which a current search starts is a value of the search period parameter.

In the foregoing technical solution, four search parameters used to search for a cell are provided. Search parameters in this embodiment of this application are not limited to the foregoing four search parameters.

In one example design, the first terminal adjusts, based on the second information, a value/values of one or more of search parameters used to search for a cell at the first location, to obtain the value of the search parameter of the first terminal at the first location.

In the foregoing technical solution, because the value of the search parameter used by the terminal device to perform cell search is a value obtained after adjustment performed based on the second information, the terminal device may perform cell search based on an actual status of a cell distributed at the first location, so that a case in which the terminal device performs unnecessary cell search can be reduced, and power consumption of the terminal device can be reduced.

In one example design, when the second information indicates that there is a cell at the first location, the first terminal decreases the value of the search period parameter in the search parameter, and/or increases the value of the parameter of the maximum quantity of search times in the search parameter, to obtain a first search parameter value, and the first search parameter value is the value that is of the search parameter at the first location and that is determined by the first terminal.

In the foregoing technical solution, when the second information indicates that there is a cell at the first location, the terminal device may decrease the value of the search period parameter in the search parameter, so that a cell search speed of the terminal device can be increased, and cell search time can be reduced. In addition/alternatively, the terminal device may increase the value of the parameter of the maximum quantity of search times in the search parameter, so that the terminal device can perform search more times at a location at which the terminal device determines that there is a cell, and a cell search success rate can be improved.

In one example design, if access reference information corresponding to the first location includes the fourth indication information, the fourth indication information is used to indicate that a cell is successfully accessed/found at the first location, and indicate the one or more cells successfully accessed/found at the first location and the related information of the one or more successfully accessed/found cells, and the related information of the cell includes the carrier frequency of the cell, when the second information indicates that there is a cell at the first location, the first terminal may adjust the value of the search carrier frequency parameter included in the search parameter to a value/values of the carrier frequency/carrier frequencies of the one or more cells that are successfully accessed/found at the first location and that are indicated in the fourth indication information, to obtain the first search parameter value, and the first search parameter value is the value that is of the search parameter at the first location and that is determined by the first terminal.

In the foregoing technical solution, when the fourth indication information indicates that a cell is successfully accessed/found at the first location, in other words, there is a cell at the first location, and the terminal device can learn of the carrier frequency of the cell successfully accessed/found at the first location, the terminal device may adjust the value of the search carrier frequency parameter to the value/values of the carrier frequency/carrier frequencies of the one or more successfully accessed/found cells, so that the terminal device can quickly locate the carrier frequency of the cell, and time of performing search in a plurality of carrier frequencies can be reduced.

In one example design, if access reference information corresponding to the first location includes the fourth indication information, the fourth indication information is used to indicate that a cell is successfully accessed/found at the first location, and indicate the one or more cells successfully accessed/found at the first location and the related information of the one or more successfully accessed/found cells, and the related information of the cell includes the carrier frequency of the cell, the first terminal may decrease the value of the location change threshold in the search parameter when the second information indicates that a value of a carrier frequency of a first cell successfully accessed/found at the first location is greater than or equal to a first preset value.

In the foregoing technical solution, considering that a higher frequency indicates a smaller coverage area, when the fourth indication information indicates that a cell is successfully accessed/found at the first location, in other words, there is a cell at the first location, and the terminal device determines that the carrier frequency of the cell successfully accessed/found at the first location is greater than or equal to the first preset value, it may be considered that the cell at the first location is a high-frequency cell. Therefore, a relatively small location change threshold may be used to search for a cell, so that a cell search success rate can be improved.

In one example design, if access reference information corresponding to the first location includes the fourth indication information, the fourth indication information is used to indicate that a cell is successfully accessed/found at the first location, and indicate the one or more cells successfully accessed/found at the first location and the related information of the one or more successfully accessed/found cells, and the related information of the cell includes the carrier frequency of the cell, the first terminal may increase the value of the location change threshold in the search parameter when the second information indicates that a value of a carrier frequency of a first cell successfully accessed/found at the first location is less than a second preset value.

In the foregoing technical solution, considering that a lower frequency indicates a larger coverage area, when the fourth indication information indicates that a cell is successfully accessed/found at the first location, in other words, there is a cell at the first location, and the terminal device determines that the carrier frequency of the cell successfully accessed/found at the first location is less than the second preset value, it may be considered that the cell at the first location is a low-frequency cell. Therefore, a relatively large location change threshold may be used to search for a cell, so that cell search time can be shortened.

In one example design, when the second information indicates that there is no cell at the first location, the first terminal increases the value of the search period parameter in the plurality of search parameters, and/or decreases the value of the parameter of the maximum quantity of search times in the plurality of search parameters, to determine that the value of the search parameter of the first terminal at the first location is a second search parameter value.

In the foregoing technical solution, when the second information indicates that there is no cell at the first location, the terminal device may increase the value of the search period parameter in the search parameter, so that cell search time can be reduced; and/or the terminal device may decrease the value of the parameter of the maximum quantity of search times in the search parameter, so that the terminal device can perform search only a small quantity of times at a location at which it is indicated that there is no cell, and power consumption of the terminal device can be reduced.

In one example design, the first terminal broadcasts and/or stores a search result after searching for a cell based on the value of the search parameter, and the search result is used to indicate information about the cell successfully accessed/found at the first location, or the search result is used to indicate that no cell is found at the first location.

In the foregoing technical solution, the terminal device may broadcast the search result at the first location, so that when another terminal device needs to perform cell search at the first location, the another terminal device may be assisted, based on the search result, in quickly searching for a cell at the first location with relatively low energy consumption. The terminal device may store the search result at the first location, to help the terminal device determine a value of a search parameter when the terminal device performs cell search at the first location next time.

According to a second aspect, an embodiment of this application provides a communications apparatus, where the communications apparatus includes a processor, configured to implement the method described in the first aspect. The communications apparatus may further include a memory, configured to store a program instruction and data. The memory is coupled to the processor, and the processor may invoke and execute the program instruction stored in the memory, to implement any method in the methods described in the first aspect. The communications apparatus may further include a transceiver, and the transceiver is used by the communications apparatus to communicate with another device. For example, the another device is a second terminal.

In one example design, the communications apparatus includes the processor and the transceiver.

The transceiver obtains first information before searching for a cell at a first location, where the first information includes historical access information that is obtained from one or more second terminals near the communications apparatus in a short-distance communication manner and that corresponds to each second terminal at the first location, and historical access information corresponding to the first location indicates whether there is a cell at the first location.

The processor determines a value of a search parameter of the communications apparatus at the first location based on second information, where the second information includes the first information.

The transceiver searches for a cell at the first location based on the value of the search parameter.

In one example design, the second information further includes historical access information that is stored by the communications apparatus and that corresponds to the communications apparatus at the first location.

In one example design, the historical access information corresponding to the first location includes first indication information, and the first indication information is used to indicate that a cell is successfully accessed/found at the first location, or the first indication information is used to indicate that no cell is successfully accessed/found at the first location.

In one example design, the historical access information corresponding to the first location includes second indication information, and the second indication information is used to indicate that a cell is successfully accessed/found at the first location, and indicate one or more cells found at the first location.

In one example design, the historical access information corresponding to the first location includes third indication information, and the third indication information is used to indicate that a cell is successfully accessed/found at the first location, and indicate one or more cells successfully accessed at the first location.

In one example design, the historical access information corresponding to the first location includes fourth indication information, the fourth indication information is used to indicate that a cell is successfully accessed/found at the first location, and indicate one or more cells successfully accessed/found at the first location and related information of the one or more successfully accessed/found cells, and the related information of the cell includes a carrier frequency of the cell.

In one example design, the search parameter includes at least one of a search carrier frequency parameter, a location change threshold parameter, a parameter of a maximum quantity of search times, and a search period parameter, and the transceiver searches for a cell based on a value of the search carrier frequency parameter; when a quantity of times of searching for a cell by the transceiver at a location is equal to a value of the parameter of the maximum quantity of search times, the processor determines that there is no cell at the location; when the communications apparatus is displaced and a displacement amount is greater than or equal to a value of the location change threshold parameter, the transceiver re-searches for a cell at a location of the communications apparatus after the displacement and re-collects statistics about a quantity of cell search times; and when the transceiver searches for a cell at a location, a time interval between a moment at which a previous search ends and a moment at which a current search starts is a value of the search period parameter.

In one example design, that the processor determines a value of a search parameter of the communications apparatus at the first location based on the second information includes:

the processor adjusts, based on the second information, a value/values of one or more of search parameters used to search for a cell at the first location, to obtain the value of the search parameter of the communications apparatus at the first location.

In one example design, that the processor determines a value of a search parameter of the communications apparatus at the first location based on the second information includes:

when the second information indicates that there is a cell at the first location, the processor determines that the value of the search parameter at the first location is a first search parameter value; and that the processor determines that the value of the search parameter at the first location is a first search parameter value includes: the processor decreases the value of the search period parameter in the search parameter, and/or increases the value of the parameter of the maximum quantity of search times in the search parameter.

In one example design, access reference information corresponding to the first location includes the fourth indication information, the fourth indication information is used to indicate that a cell is successfully accessed/found at the first location, and indicate the one or more cells successfully accessed/found at the first location and the related information of the one or more successfully accessed/found cells, and the related information of the cell includes the carrier frequency of the cell;

that the processor adjusts, based on the second information, a value/values of one or more of the search parameters includes:

when the second information indicates that there is a cell at the first location, the processor determines that the value of the search parameter at the first location is the first search parameter value; and that the processor determines that the value of the search parameter at the first location is the first search parameter value includes:

the processor adjusts the value of the search carrier frequency parameter included in the search parameter to a value/values of the carrier frequency/carrier frequencies of the one or more cells that are successfully accessed/found at the first location and that are indicated in the fourth indication information.

In one example design, access reference information corresponding to the first location includes the fourth indication information, the fourth indication information is used to indicate that a cell is successfully accessed/found at the first location, and indicate the one or more cells successfully accessed/found at the first location and the related information of the one or more successfully accessed/found cells, and the related information of the cell includes the carrier frequency of the cell; and that the processor adjusts, based on the second information, a value/values of one or more of the search parameters includes:

the processor decreases the value of the location change threshold in the search parameter when the second information indicates that a value of a carrier frequency of a first cell successfully accessed/found at the first location is greater than or equal to a first preset value; or the processor increases the value of the location change threshold in the search parameter when the second information indicates that a value of a carrier frequency of a first cell successfully accessed/found at the first location is less than a second preset value.

In one example design, that the processor determines a value of a search parameter of the communications apparatus at the first location based on second information includes:

when the second information indicates that there is no cell at the first location, the processor increases the value of the search period parameter in the plurality of search parameters, and/or decreases the value of the parameter of the maximum quantity of search times in the plurality of search parameters, to determine that the value of the search parameter of the communications apparatus at the first location is a second search parameter value.

In one example design, the transceiver is further configured to:

broadcast and/or store a search result under the control of the processor after searching for a cell based on the value of the search parameter, where the search result is used to indicate information about the cell successfully accessed/found at the first location, or the search result is used to indicate that no cell is found at the first location.

According to a third aspect, an embodiment of this application provides a communications apparatus. The communications apparatus may be a terminal, or may be an apparatus in the terminal. The communications apparatus may include a processing module and a transceiver module. The modules may perform corresponding functions performed by the first terminal in any design example of the first aspect. Details are as follows:

The transceiver module is configured to obtain first information before searching for a cell at a first location, where the first information includes historical access information that is obtained from one or more second terminals near the communications apparatus in a short-distance communication manner and that corresponds to each second terminal at the first location, and historical access information corresponding to the first location indicates whether there is a cell at the first location.

The processing module is configured to determine a value of a search parameter of the communications apparatus at the first location based on second information, where the second information includes the first information.

The transceiver module is further configured to search for a cell at the first location based on the value of the search parameter.

In one example design, the second information further includes historical access information that is stored by the communications apparatus and that corresponds to the communications apparatus at the first location.

In one example design, the historical access information corresponding to the first location includes first indication information, and the first indication information is used to indicate that a cell is successfully accessed/found at the first location, or the first indication information is used to indicate that no cell is successfully accessed/found at the first location.

In one example design, the historical access information corresponding to the first location includes second indication information, and the second indication information is used to indicate that a cell is successfully accessed/found at the first location, and indicate one or more cells found at the first location.

In one example design, the historical access information corresponding to the first location includes third indication information, and the third indication information is used to indicate that a cell is successfully accessed/found at the first location, and indicate one or more cells successfully accessed at the first location.

In one example design, the historical access information corresponding to the first location includes fourth indication information, the fourth indication information is used to indicate that a cell is successfully accessed/found at the first location, and indicate one or more cells successfully accessed/found at the first location and related information of the one or more successfully accessed/found cells, and the related information of the cell includes a carrier frequency of the cell.

In one example design, the search parameter includes at least one of a search carrier frequency parameter, a location change threshold parameter, a parameter of a maximum quantity of search times, and a search period parameter, and the transceiver module searches for a cell based on a value of the search carrier frequency parameter; when a quantity of times of searching for a cell by the transceiver module at a location is equal to a value of the parameter of the maximum quantity of search times, the processing module determines that there is no cell at the location; when the communications apparatus is displaced and a displacement amount is greater than or equal to a value of the location change threshold parameter, the transceiver module re-searches for a cell at a location of the communications apparatus after the displacement and re-collects statistics about a quantity of cell search times; and when the transceiver module searches for a cell at a location, a time interval between a moment at which a previous search ends and a moment at which a current search starts is a value of the search period parameter.

In one example design, that the processing module determines a value of a search parameter of the communications apparatus at the first location based on the second information includes:

the processing module adjusts, based on the second information, a value/values of one or more of search parameters used to search for a cell at the first location, to obtain the value of the search parameter of the communications apparatus at the first location.

In one example design, that the processing module determines a value of a search parameter of the communications apparatus at the first location based on the second information includes:

when the second information indicates that there is a cell at the first location, the processing module determines that the value of the search parameter at the first location is a first search parameter value; and that the processing module determines that the value of the search parameter at the first location is a first search parameter value includes:

the processing module decreases the value of the search period parameter in the search parameter, and/or increases the value of the parameter of the maximum quantity of search times in the search parameter.

In one example design, access reference information corresponding to the first location includes the fourth indication information, the fourth indication information is used to indicate that a cell is successfully accessed/found at the first location, and indicate the one or more cells successfully accessed/found at the first location and the related information of the one or more successfully accessed/found cells, and the related information of the cell includes the carrier frequency of the cell;

that the processing module adjusts, based on the second information, a value/values of one or more of the search parameters includes:

when the second information indicates that there is a cell at the first location, the processing module determines that the value of the search parameter at the first location is the first search parameter value; and that the processing module determines that the value of the search parameter at the first location is the first search parameter value includes:

the processing module adjusts the value of the search carrier frequency parameter included in the search parameter to a value/values of the carrier frequency/carrier frequencies of the one or more cells that are successfully accessed/found at the first location and that are indicated in the fourth indication information.

In one example design, access reference information corresponding to the first location includes the fourth indication information, the fourth indication information is used to indicate that a cell is successfully accessed/found at the first location, and indicate the one or more cells successfully accessed/found at the first location and the related information of the one or more successfully accessed/found cells, and the related information of the cell includes the carrier frequency of the cell; and that the processing module adjusts, based on the second information, a value/values of one or more of the search parameters includes:

the processing module decreases the value of the location change threshold in the search parameter when the second information indicates that a value of a carrier frequency of a first cell successfully accessed/found at the first location is greater than or equal to a first preset value; or the processing module increases the value of the location change threshold in the search parameter when the second information indicates that a value of a carrier frequency of a first cell successfully accessed/found at the first location is less than a second preset value.

In one example design, that the processing module determines a value of a search parameter of the communications apparatus at the first location based on second information includes:

when the second information indicates that there is no cell at the first location, the processing module increases the value of the search period parameter in the plurality of search parameters, and/or decreases the value of the parameter of the maximum quantity of search times in the plurality of search parameters, to determine that the value of the search parameter of the communications apparatus at the first location is a second search parameter value.

In one example design, the transceiver module is further configured to:

broadcast and/or store a search result after searching for a cell based on the value of the search parameter, where the search result is used to indicate information about the cell successfully accessed/found at the first location, or the search result is used to indicate that no cell is found at the first location.

According to a fourth aspect, an embodiment of this application further provides a computer-readable storage medium, including an instruction. When the instruction is run on a computer, the computer is enabled to perform the method according to the first aspect.

According to a fifth aspect, an embodiment of this application further provides a computer program product, including an instruction. When the computer program product is run on a computer, the computer is enabled to perform the method according to the first aspect.

According to a sixth aspect, an embodiment of this application provides a chip system. The chip system includes a processor, and may further include a memory. The chip system is configured to implement the method according to the first aspect. The chip system may include a chip, or may include a chip and another discrete component.

For beneficial effects of the second aspect to the sixth aspect and the implementations of the second aspect to the sixth aspect, refer to the descriptions of the beneficial effects of the method in the first aspect and the implementations of the first aspect.

The embodiments provided in this application further include any one of the following embodiments (there is no clear correspondence between numbers of the embodiments provided in this part and numbers of embodiments in the other part of this specification, and the numbers are merely for ease of description of this part):

1. A cell search method, applied to user equipment (UE) and including:

adjusting, by the UE, a search parameter of a small cell based on data shared by other UE and historical access information recorded by the UE, where the search parameter includes a search carrier frequency of the UE, a location change threshold X of the UE, a search period Y of the small cell, and a maximum quantity Z of search times of the small cell, where the small cell may be a 5G cell when a 4G base station and a 5G base station coexist, or may be a high-frequency cell when a 5G low-frequency base station and a 5G high-frequency base station coexist.

2. The method according to embodiment 1, where the search carrier frequency f of the UE, the location change threshold X of the UE, the search period Y of the small cell, and the maximum quantity Z of search times of the small cell are preconfigured; and the location change threshold X may be related to the search carrier frequency.

3. The method according to embodiment 1, where the data shared by the other UE may include information such as information indicating whether there is a small cell, and a carrier frequency of the small cell when there is the small cell, and a sharing manner of the other UE may be a manner such as D2D communication, Wi-Fi, or Bluetooth; and location information of the UE may be obtained by using a GPS, macro base station positioning, an accelerometer, a direction sensor, and the like.

4. The method according to embodiment 1, where the historical access information recorded by the UE may include a carrier frequency, location information, a physical cell identifier (PCI) of a macro base station, and the like; and the macro base station may be a 4G base station when the 4G base station and a 5G base station coexist, or may be a low-frequency base station when a 5G low-frequency base station and a 5G high-frequency base station coexist.

5. The method according to any one of embodiments 1 to 4, including:

if the data shared by the other UE indicates that there is a small cell nearby, or no data is received from the other UE but historical data recorded by the UE indicates that there is a small cell nearby, decreasing the search period Y of the small cell, and increasing the maximum quantity Z of search times.

6. The method according to any one of embodiments 1 to 4, including: if historical data recorded by the UE or the data shared by the other UE further includes a carrier frequency of the small cell, setting a carrier frequency for searching for the small cell to the frequency, and configuring a corresponding location change threshold X.

7. The method according to any one of embodiments 1 to 4, including:

if the data shared by the other UE indicates that there is no small cell nearby, or no data is received from the other UE but historical data recorded by the UE indicates that there is no small cell nearby, increasing the search period Y of the small cell, and decreasing the maximum quantity Z of search times.

8. The method according to any one of embodiments 1 to 7, including:

monitoring, by the UE, location movement of the UE, and stopping searching for the small cell if a location change of the UE is less than the preset threshold X and the small cell still cannot be found after Z times of search attempts, or resetting a count of search times to 0 and returning to step 1 if a location change of the UE is greater than the preset threshold X.

9. The method according to embodiment 1 or 3, where whether the UE shares access information of the UE is determined by the UE, and may be determined based on information such as a setting of a user and a quantity of remaining electricity of the UE; and for example, if the user disables this function, sharing is stopped; or if the quantity of electricity of the UE is relatively small, sharing may be stopped.

10. The method according to embodiment 1 or 4, where storage of the historical access information of the UE may be determined by the UE, and if space for storing the historical access information by the UE is full, the UE may consider deleting the earliest access data or deleting the least frequently used access data.

BRIEF DESCRIPTION OF DRAWINGS

FIG. 5A is another schematic diagram of recording historical access information according to an embodiment of this application;

FIG. 5B is another schematic diagram of recording historical access information according to an embodiment of this application;

DESCRIPTION OF EMBODIMENTS

The following clearly and completely describes the technical solutions in the embodiments of this application with reference to the accompanying drawings in the embodiments of this application.

The technical solutions in the embodiments of this application may be applied to various radio access technology (radio access technology, RAT) systems, for example, a new radio (new radio, NR) system, Wi-Fi, a worldwide interoperability for microwave access (worldwide interoperability for microwave access, WiMAX) system, a long term evolution (long term evolution, LTE) system, a long term evolution-advanced (advanced long term evolution, LTE-A) system, a universal mobile telecommunications system (universal mobile telecommunication system, UMTS), a cellular system related to the 3rd generation partnership project (the 3rd generation partnership project, 3GPP), a 4th generation (4th generation, 4G) system, a 5G system, or the like.

In addition, the communications system may be further applicable to a future-oriented communications technology. The systems described in the embodiments of this application are intended to describe the technical solutions in the embodiments of this application more clearly, and constitute no limitation on the technical solutions provided in the embodiments of this application. A person of ordinary skill in the art may learn that, with evolution of network architectures, the technical solutions provided in the embodiments of this application are also applicable to a similar technical problem.

An application scenario of the embodiments is briefly described below.

Figure 1A:
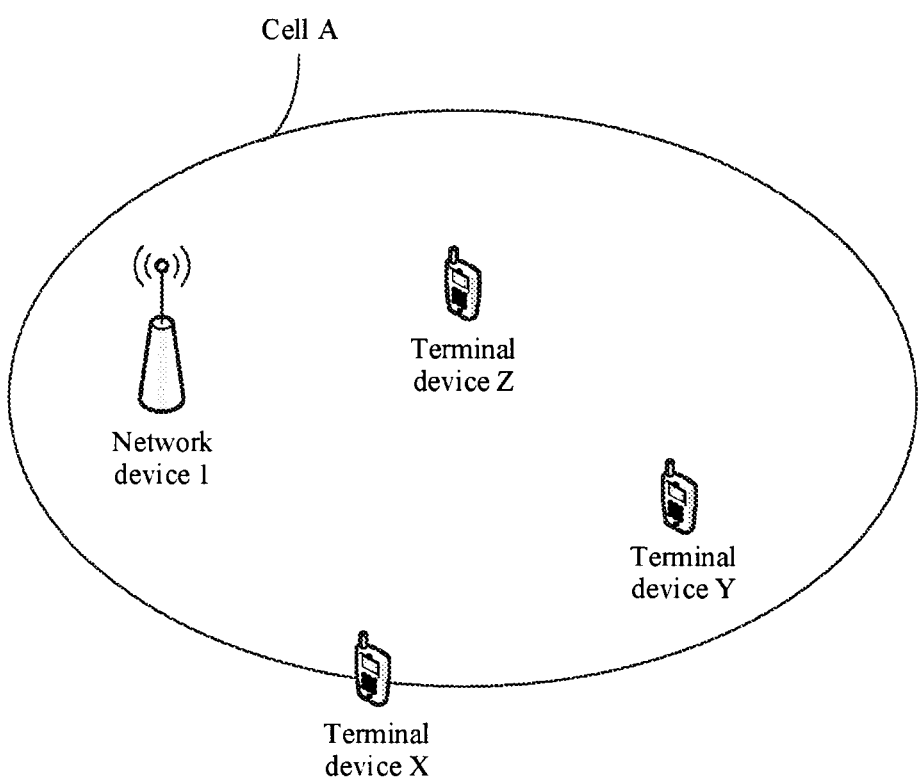
FIG. 1A is a schematic structural diagram of a communications system according to an embodiment of this application.

FIG. 1A is a schematic diagram of a communications system according to an embodiment of this application. The communications system shown in FIG. 1A includes one network device and a plurality of terminal devices. A coverage area corresponding to the network device is a cell A, and the plurality of terminal devices are a terminal device A, a terminal device B, and a terminal device C. The plurality of terminal devices may be terminal devices that directly perform communication. For example, the plurality of terminal devices may be terminal devices used for device-to-device (device-to-device, D2D) communication, may be terminal devices used for vehicle-to-everything (vehicle to everything, V2X) communication, or certainly may be terminal devices that use another communications technology for communication, for example, may be terminal devices that use a Bluetooth or wireless fidelity (wireless-fidelity, WIFI) technology, or may be terminal devices that use another technology that can enable direct communication between terminal devices in future communications technologies. This is not limited in this embodiment of this application. The plurality of terminal devices may perform cellular communication with the network device. For example, the network device may send downlink information to the terminal device A, the terminal device B, and the terminal device C, and the terminal device A, the terminal device B, and the terminal device C may send uplink information to the network device.

Figure 1B:
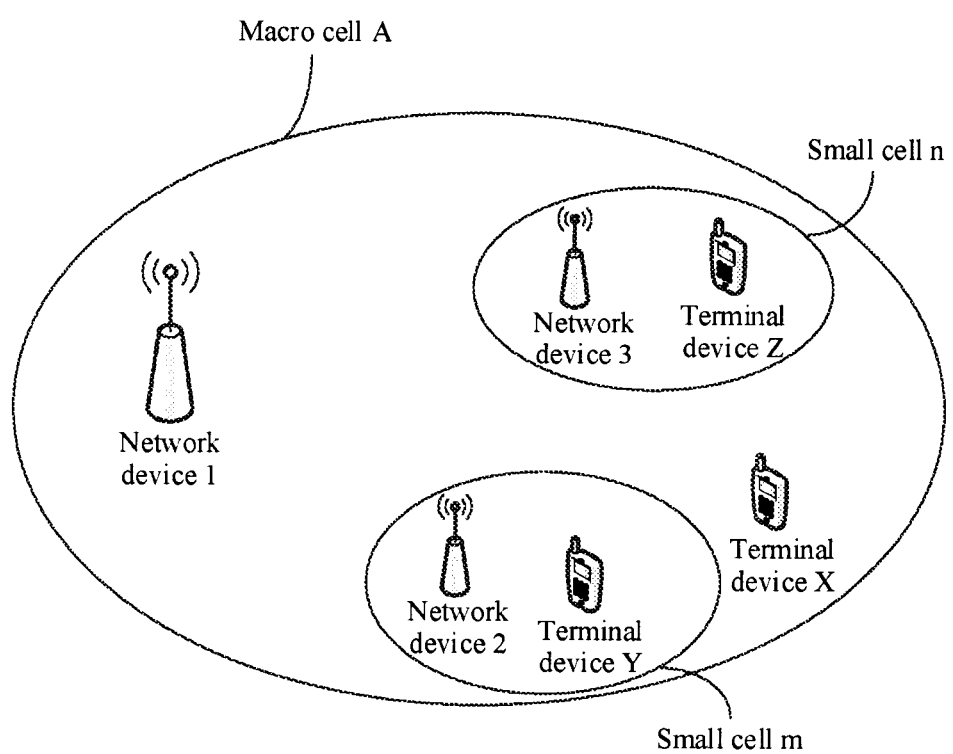
FIG. 1B is a schematic structural diagram of another communications system according to an embodiment of this application.

Different from that in FIG. 1A, a communications system shown in FIG. 1B includes a plurality of network devices. The plurality of network devices may include a network device A, a network device B, and a network device C. A coverage area corresponding to the network device A is a cell A, a coverage area corresponding to the network device B is a cell B, a coverage area corresponding to the network device C is a cell C, and the coverage area of the cell A is larger than the coverage area of the cell B or the cell C. The cell A may be referred to as a macro cell A, and the cell B and the cell C may be respectively referred to as a small cell m and a small cell n. Any one of the plurality of terminal devices may communicate with the network device A, the network device B, and the network device C. The terminal device A is used as an example. When entering the macro cell A, the terminal device A may communicate with the network device A. When entering the small cell m, the terminal device A may initiate a random access process to the network device B, to hand over an accessed network device from the network device A to the network device B, so as to communicate with the network device B. Any two of the plurality of terminal devices may directly communicate with each other. A specific communication manner is the same as that in FIG. 1A, and details are not described herein again.

The network device in this embodiment of this application may be an access network device such as a base station (BS), a transmission reception point (TRP), an evolved NodeB (eNB), a radio network controller (RNC), a NodeB (NB), a base station controller (BSC), a base transceiver station (BTS), a baseband unit (BBU), a wireless fidelity (Wi-Fi) access point (AP), or a relay (RN) device, or may be a device that communicates with a terminal device over an air interface by using one or more cells in an access network. The network device may be configured to: mutually convert a received air interface frame and an internet protocol (IP) packet, and serve as a router between the terminal device and a remaining part of the access network. The remaining part of the access network may include an IP network. The network device may further coordinate attribute management of the air interface. If the network device is a base station, the base station may be a macro base station, a micro base station, a pico base station, a small cell, a relay station, or the like. For example, the base station may be an evolved NodeB (NodeB, evolved NodeB, or evolutional NodeB) in an LTE system or an LTE-advanced (LTE-A) system, or may be a next generation NodeB (gNB) in a 5G system. This is not limited in this embodiment of this application. In this embodiment of this application, an apparatus that implements a function of the network device may be a network device, or may be an apparatus that supports the network device to implement the function, such as a chip, a circuit, or another apparatus.

The terminal device in this embodiment of this application may also be referred to as a terminal, and may be a device having a wireless transceiver function. The terminal device may be deployed on land, and includes an indoor device, an outdoor device, a handheld device, or a vehicle-mounted device. Alternatively, the terminal device may be deployed on a water surface (for example, on a ship), or may be deployed in the air (for example, on an aircraft, a balloon, or a satellite). The terminal device may be user equipment (UE). The UE is a handheld device, a vehicle-mounted device, a wearable device, or a computing device that has a wireless communication function. For example, the UE may be a mobile phone, a tablet computer, or a computer with a wireless transceiver function. Alternatively, the terminal device may be a virtual reality (virtual reality, VR) terminal device, an augmented reality (augmented reality, AR) terminal device, a wireless terminal in industrial control, a wireless terminal in unmanned driving, a wireless terminal in telemedicine, a wireless terminal in a smart grid, a wireless terminal in a smart city, a wireless terminal in a smart home (smart home), or the like. In this embodiment of this application, an apparatus that implements a function of the terminal may be a terminal, or may be an apparatus that supports the terminal to implement the function, such as a chip, a circuit, or another apparatus.

It should be noted that, quantities and types of the network devices and the terminal devices included in the communications systems shown in FIG. 1A and FIG. 1B are merely examples. The embodiments of this application are not limited thereto. For example, the communications system to which the embodiments of this application are applied may further include more network devices, or include more terminal devices that can communicate with a network device, which are not shown one by one in the accompanying drawings for brevity. In addition, in the communications systems shown in FIG. 1A and FIG. 1B, although the network devices and the terminal devices are shown, the communications systems may not be limited to the network devices and the terminal devices, for example, may further include a core network device, a device configured to carry a virtualized network function, or the like. These are clear to a person of ordinary skill in the art, and details are not described herein.

In the embodiments of this application, the terms "system" and "network" may be used interchangeably. "A plurality of" may be two, three, or more. This is not limited in the embodiments of this application. "A positive integer quantity of" may be one or more.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects, if without special explanation.

Unless otherwise stated, in the embodiments of this application, ordinal numbers such as "first", "second", "third", and "fourth" are used to distinguish between a plurality of objects, and not intended to limit an order, a time sequence, priorities, or importance of the plurality of objects.

The following describes, by using the communications system shown in FIG. 1B, a process in which a terminal device accesses a network device in the prior art.

Figure 2:
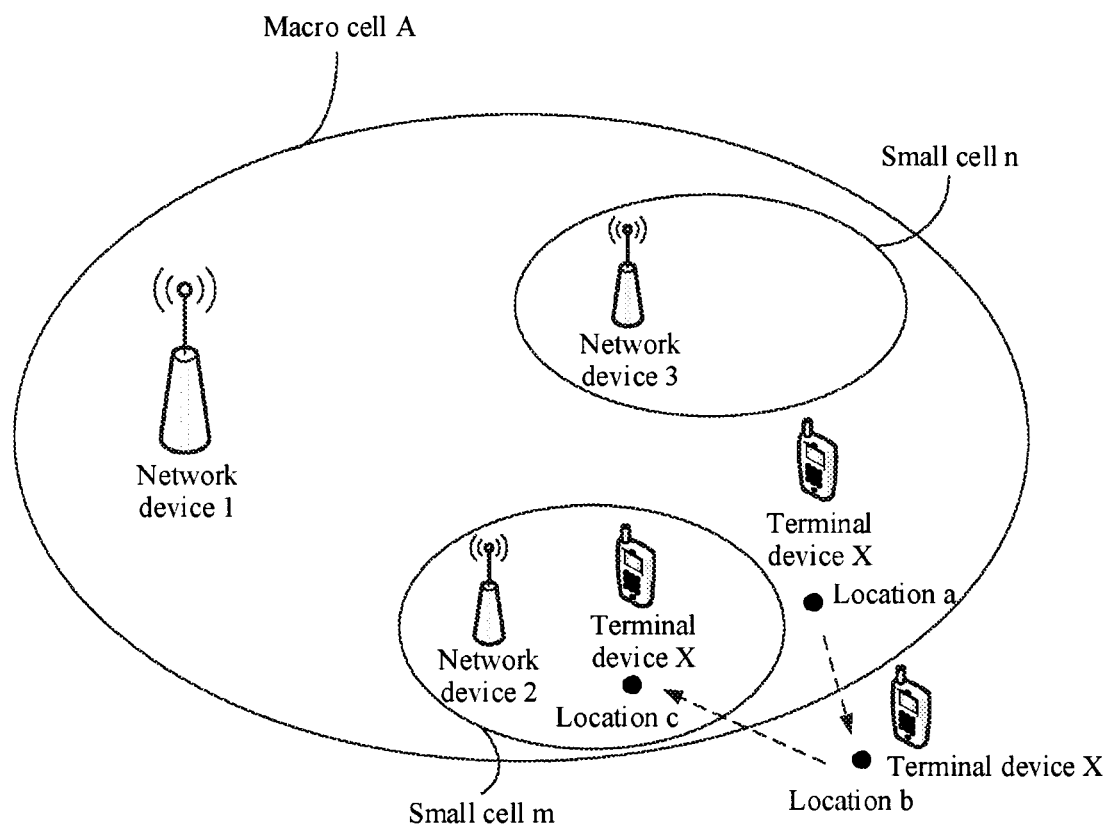
FIG. 2 is a schematic diagram of performing cell search by a terminal device in the prior art.

Referring to FIG. 2, after the terminal device X, the terminal device Y, and the terminal device Z are powered on, the terminal device X, the terminal device Y, and the terminal device Z separately perform cell search based on preset search parameters, for example, a search carrier frequency parameter, a location change threshold parameter, a parameter of a maximum quantity of search times, and a search period parameter. The terminal device X is used as an example. After the terminal device X is powered on at a location a, based on a preset search carrier frequency and a preset search period, the terminal device X detects a cell-specific reference signal broadcast by a network device, and counts a quantity of search times. For example, if preset search carrier frequencies are a carrier frequency 1, a carrier frequency 2, and a carrier frequency 3, the terminal device X separately searches for a cell-specific reference signal on the three carrier frequencies. It is assumed that a carrier frequency of the macro cell A is the carrier frequency 2. In this case, because the location a is within the coverage area of the network device 1, when the terminal device X searches for a cell-specific reference signal on the carrier frequency 2, the terminal device X detects a reference signal that is of the macro cell A and that is broadcast by the network device 1. Then, the terminal device X measures a reference signal received power (reference signal receiving power, RSRP) or reference signal received quality (reference signal receiving quality, RSRQ) of the found reference signal of the macro cell A. If the terminal device X determines that an RSRP measurement value or an RSRQ measurement value of the reference signal of the macro cell A is greater than or equal to a preset threshold, the terminal device X initiates a random access process to the network device 1 corresponding to the macro cell A, to access the network device 1.

When the terminal device X keeps moving, for example, when the terminal device X moves from the location a to a location b, the terminal device X determines that a moving location reaches a preset location change threshold. In this case, the terminal device X re-performs cell search based on a preset search parameter, and recounts a quantity of search times. Because the location b is not covered by a cell of a network device, when the terminal device X determines that a quantity of search times at the location b reaches a preset maximum quantity of search times, the terminal device X stops a cell search process at the location b. Then, the terminal device X moves again, for example, moves from the location b to a location c. If the terminal device X determines that a moving location exceeds the preset location change threshold, the terminal device X re-performs cell search based on the preset search carrier frequency. It is assumed that a carrier frequency of the small cell m is the carrier frequency 3. In this case, because the location c is within the coverage area of the network device 2, when the terminal device X searches for a cell-specific reference signal on the carrier frequency 3, the terminal device X detects a reference signal that is of the small cell m and that is broadcast by the network device 2. Then, if the terminal device X determines that an RSRP measurement value or an RSRQ measurement value of the small cell m is greater than or equal to the threshold, the terminal device X initiates a random access process to the network device 2, to hand over to the network device 2, so as to perform communication by using the network device 2.

It can be learned from the foregoing cell search process that, due to uncertainty and discontinuity of network device distribution, when accessing a network device, a terminal device needs to search for cells, for example, a macro cell or a small cell, of all network devices a plurality of times based on a preset search parameter. This wastes time, and increases power consumption.

In view of this, an embodiment provides a cell search method, to reduce time and power consumption required by a terminal device to perform cell search.

The following describes the technical solutions provided in the embodiments of this application with reference to the accompanying drawings.

Figure 3:
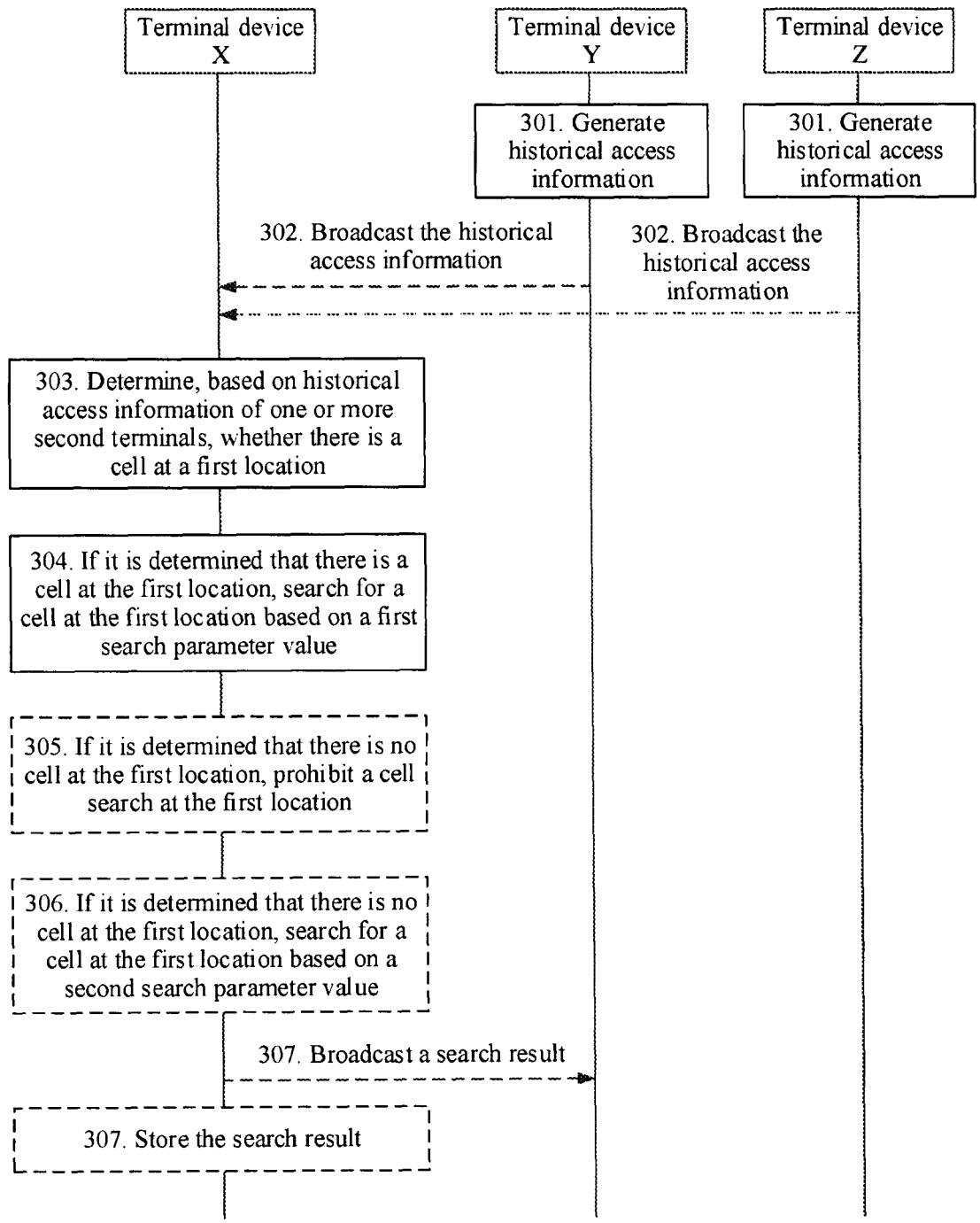
FIG. 3 is a flowchart of a cell search method according to an embodiment of this application.

FIG. 3 is a flowchart of a cell search method according to an embodiment. In the following description process, the technical solutions provided in the embodiments of this application are applied to an application scenario shown in FIG. 1B, and a cell search process of one of the terminal devices in the communications system shown in FIG. 1B, for example, a cell search process of the terminal device X (which is also referred to as a first terminal in this specification) is used as an example for description. The flowchart of the method is described as follows:

Step 301: Another terminal device near a first location generates historical access information.

The another terminal device near the first location is also referred to as a second terminal in this application. There may be one or more second terminals.

After being powered on, the another terminal device may perform cell search based on a preset search parameter. A specific search process is the same as that in the method shown in FIG. 2, and details are not described herein again. After the another terminal device performs cell search, the another terminal device generates the historical access information. In this embodiment, the another terminal device is a terminal device other than the terminal device X in the application scenario shown in FIG. 1B, for example, the terminal device Y or the terminal device Z.

For example, the another terminal device is the terminal device Y, and the historical access information of the terminal device Y may include the following several forms.

A first form is as follows:

The historical access information of the terminal device Y includes only information about a location at which the terminal device Y is located when the terminal device Y successfully accesses a network device or finds a cell.

In an example, the terminal device Y fails to access a network device at a location d, but accesses the network device 1 at a location e by using the macro cell A, and accesses the network device 3 at a location f by using the small cell n. In this case, the historical access information of the terminal device Y includes only information about the location e and information about the location f.

A second form is as follows:

The historical access information of the terminal device Y includes information about a location at which the terminal device Y is located when the terminal device Y successfully accesses a network device or finds a cell, and related information of the successfully accessed/found cell corresponding to the location information.

In an example, the terminal device Y fails to access a network device at a location d, but accesses the network device 1 at a location e by using the macro cell A, and accesses the network device 3 at a location f by using the small cell n. In this case, the historical access information of the terminal device Y includes information about the location e, a carrier frequency such as a carrier 3 of a reference signal of the macro cell A corresponding to the location e and/or a physical cell identifier (PCI) such as a PCI 2 of the macro cell A, information about the location f, and a carrier frequency such as a carrier 4 of a reference signal of the small cell n corresponding to the location f and/or a PCI such as a PCI 4 of the small cell n.

A third form is as follows:

The historical access information of the terminal device Y includes information about all locations at which cell search is performed and an access status corresponding to each location.

Figures 4A, 4B:
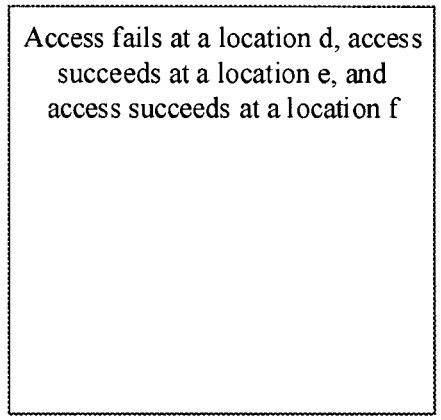
FIG. 4A is a schematic diagram of recording historical access information according to an embodiment of this application.
FIG. 4B is another schematic diagram of recording historical access information according to an embodiment of this application.

In an example, the terminal device Y fails to access a network device at a location d, but accesses the network device 1 at a location e by using the macro cell A, and accesses the network device 3 at a location f by using the small cell n. In this case, the historical access information of the terminal device Y may be recorded in a form of a description file "Access fails at the location d, access succeeds at the location e, and access succeeds at the location f", as shown in FIG. 4A.

The historical access information may alternatively be presented in a form of a table. As shown in FIG. 4B, the historical access information is divided into two columns. A first column is used to record information about each location at which cell search is performed, and a second column is used to record whether the terminal device Y successfully accesses a network device when the terminal device Y is located at the location. For the second column, the terminal device may use "yes" or "no" for representation, or may use a preset agreed bit value for representation. For example, when the bit value is 1, it indicates that the terminal device Y successfully accesses a network device at the location, or when the bit value is 0, it indicates that the terminal device Y fails to access a network device at the location. In FIG. 4B, that the second column is represented by "yes" or "no" is used as an example.

A fourth form is as follows:

The historical access information of the terminal device Y includes information about all locations at which the terminal device Y performs cell search, an access status corresponding to each location, and related information of a cell corresponding to a location at which the terminal device Y successfully accesses a network device.

In an example, the terminal device Y fails to access a network device at a location d, but accesses the network device 1 at a location e by using the macro cell A, and accesses the network device 3 at a location f by using the small cell n. In this case, the historical access information of the terminal device Y may be recorded in a form of a description file "Access fails at the location d; access succeeds at the location e, a carrier frequency of a reference signal of the macro cell A accessed at the location e is a carrier 2, and a PCI of the macro cell A is a PCI 2; and access succeeds at the location f, a carrier frequency of a reference signal of the small cell n accessed at the location f is a carrier 4, and a PCI of the small cell n is a PCI 4", as shown in FIG. 5A.

The historical access information may be presented in a form of a table. As shown in FIG. 5B, the historical access information is divided into two columns. A first column is used to record information about each location at which cell search is performed, and a second column is used to record information about a cell accessed by the terminal device Y at the location. The information about the cell may be a carrier frequency of a reference signal of the accessed cell and/or a PCI of the accessed cell. For example, the second column corresponding to the location e is used to record that a carrier frequency of a reference signal of the macro cell A is a carrier 2 and a PCI of the macro cell A is a PCI 1. The second column corresponding to the location f is used to record that a carrier frequency of a reference signal of the small cell n is a carrier 4 and a PCI of the small cell n is a PCI 4. The second column corresponding to the location d may be used to record "null" or "−", or record no information. In FIG. 5B, that the second column corresponding to the location d is used to record no information is used as an example.

A fifth form is as follows:

The historical access information recorded by the terminal device Y records related information of an accessed small cell. FIG. 2 is used as an example. When the terminal device Y is at the location c, the terminal device Y may access the network device 1 by using a reference signal of the macro cell A and access the network device 2 by using a reference signal of the small cell m in the macro cell A. In other words, the terminal device Y may access both the network device 1 and the network device 2. In this case, the terminal device Y may record a PCI of the accessed macro cell A. The PCI of the macro cell A represents information about a location at which the terminal device Y accesses the small cell m, to indicate that there is a small cell in the macro cell A.

It should be noted that the foregoing five forms are merely several examples of the historical access information, and the historical access information may alternatively be in another form. This is not limited in this embodiment of this application.

Figure 5C:
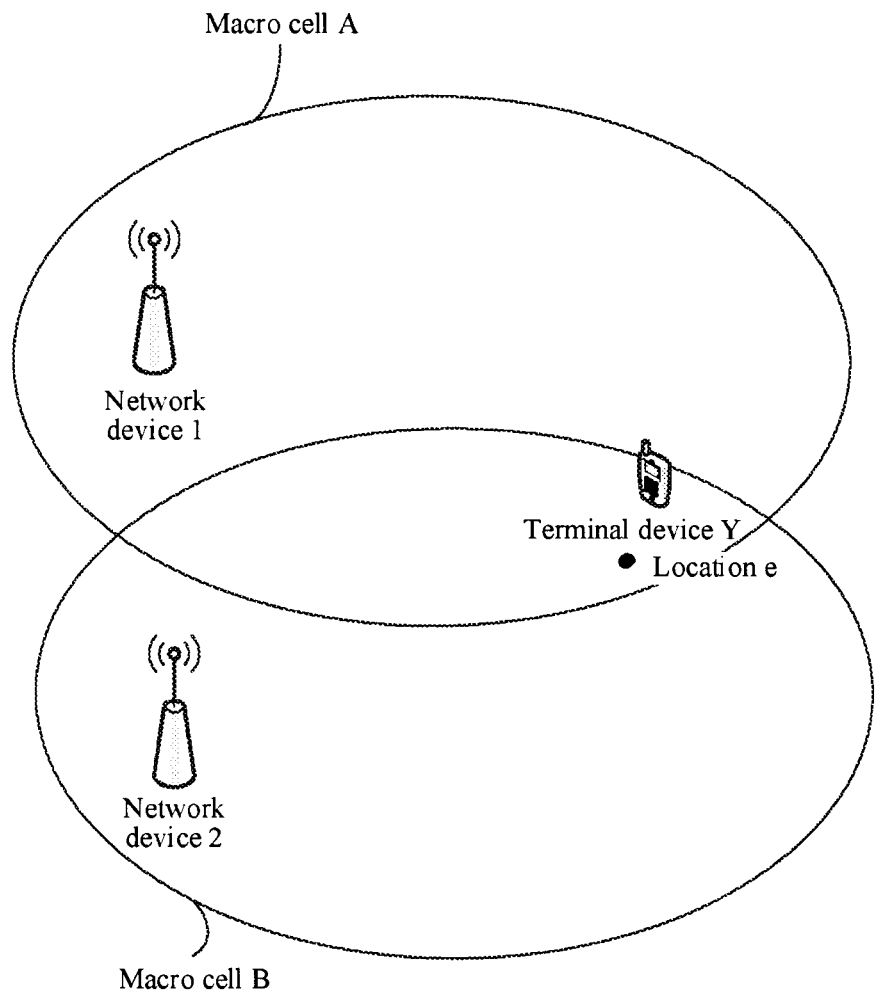
FIG. 5C is a schematic diagram in which historical access information of a terminal device may include information about a plurality of cells at a same location according to an embodiment of this application.

In addition, it should be noted that, in the foregoing five forms, only an example in which the terminal device Y accesses or finds one cell at one location is used. In an actual case, the terminal device may find a plurality of cells at one location, or the terminal device may access different cells at a same location. Therefore, the historical access information of the terminal device may include information about a plurality of cells at a same location. For example, as shown in FIG. 5C, the terminal device Y accesses the network device 1 at the location e by using the macro cell A at a first moment, and accesses the network device 2 at the location e by using a macro cell B at a second moment. In this case, the historical access information of the terminal device Y may include both information about the macro cell A and information about the macro cell B that are accessed at the location e. A manner of recording the information about the cell in the historical access information is the same as that in any one of the foregoing several forms, and details are not described herein again.

In addition, a form of historical access information recorded by the terminal device Z is the same as the form of the historical access information recorded by the terminal device Y, and details are not described herein again.

In this embodiment of this application, the location d, the location e, or the location f may be a location determined by the terminal device Y by using a global positioning system (GPS) module. For example, the GPS module is disposed in the terminal device Y, and when the terminal device Y is located at the location f, GPS coordinates displayed by the GPS module are: longitude 104.07 and latitude 30.67. The longitude and latitude information is information about the location e. Alternatively, the location e may be determined by the terminal device Y by using a network device in the communications system. For example, when the terminal device Y is at the location e, the terminal device Y may receive broadcast signals from a network device X and a network device Y. Broadcast information of each network device may carry geographical coordinates and a signal transmit power of the network device. Then, the terminal device Y determines a distance between the terminal device Y and the network device X and a distance between the terminal device Y and the network device Z based on a signal receive power of the broadcast signal received from the network device X and a signal receive power of the broadcast signal received from the network device Y, so as to determine geographical coordinates of the location e based on geographical coordinates of the network device X, geographical coordinates of the network device Y, the distance between the terminal device Y and the network device X, and the distance between the terminal device Y and the network device Y. The geographical coordinates are the information about the location e. Certainly, the location d, the location e, or the location f may alternatively be determined by the terminal device Y in another manner. This is not limited herein.

In addition, the historical access information in this embodiment of this application may record an access status of an accessed macro cell, or may record an access status of an accessed small cell, or may record both an access status of an accessed macro cell and an access status of an accessed small cell.

Step 302: The another terminal device broadcasts the historical access information of the another terminal device, and the terminal device X receives, at the first location, the historical access information broadcast by the another terminal device.

In this embodiment of this application, the historical access information received by the terminal device X from the another terminal device is first information.

After generating the historical access information, the another terminal device may broadcast the historical access information by using a frequency domain resource such as a carrier 5 preconfigured in the communications system for short-distance communication. A manner of the short-distance communication may be D2D communication. The another terminal device broadcasts the historical access information in a plurality of manners. For example, the another terminal device may continuously broadcast the historical access information provided that the another terminal device has generated the historical access information. However, continuous broadcast of the historical access information consumes electric energy of the another terminal device, and reduces a battery life of the another terminal device. Therefore, the another terminal device may alternatively broadcast the historical access information based on a specific period, for example, broadcast the historical access information for 10 s every 1 minute. Certainly, the another terminal device may alternatively broadcast the historical access information in another manner. This is not limited herein.

It should be noted that, when the communications system includes a plurality of other terminal devices, as shown in FIG. 1B, if the other terminal devices include the terminal device Y and the terminal device Z, the terminal device Y and the terminal device Z may broadcast respective historical access information by using a same frequency domain resource. For example, the terminal device Y broadcasts the historical access information of the terminal device Y in a subframe 0, a subframe 2, a subframe 4, . . . , and the like of a carrier 5, and the terminal device Z broadcasts the historical access information of the terminal device Z in a subframe 1, a subframe 3, a subframe 5, . . . , and the like of the carrier 5. Alternatively, the terminal device Y and the terminal device Z may broadcast respective historical access information by using different frequency domain resources. For example, if the terminal device Y broadcasts the historical access information of the terminal device Y by using a carrier 5, the terminal device Z broadcasts the historical access information of the terminal device Z by using a carrier, that is, a carrier 6, next to the carrier 5 used by the terminal device Y. In addition, the other terminal devices may communicate with the terminal device X by using a D2D communications technology or may broadcast the historical access information by using another communications technology, for example, a V2X, Bluetooth, or Wi-Fi communications technology. In this embodiment of this application, a time-frequency resource and a communications technology used by the terminal device Y and the terminal device Z to broadcast the historical access information are not limited. For ease of description, the following uses an example in which the other terminal devices broadcast the historical access information by using a same frequency domain resource in a D2D manner.

Figure 6A:
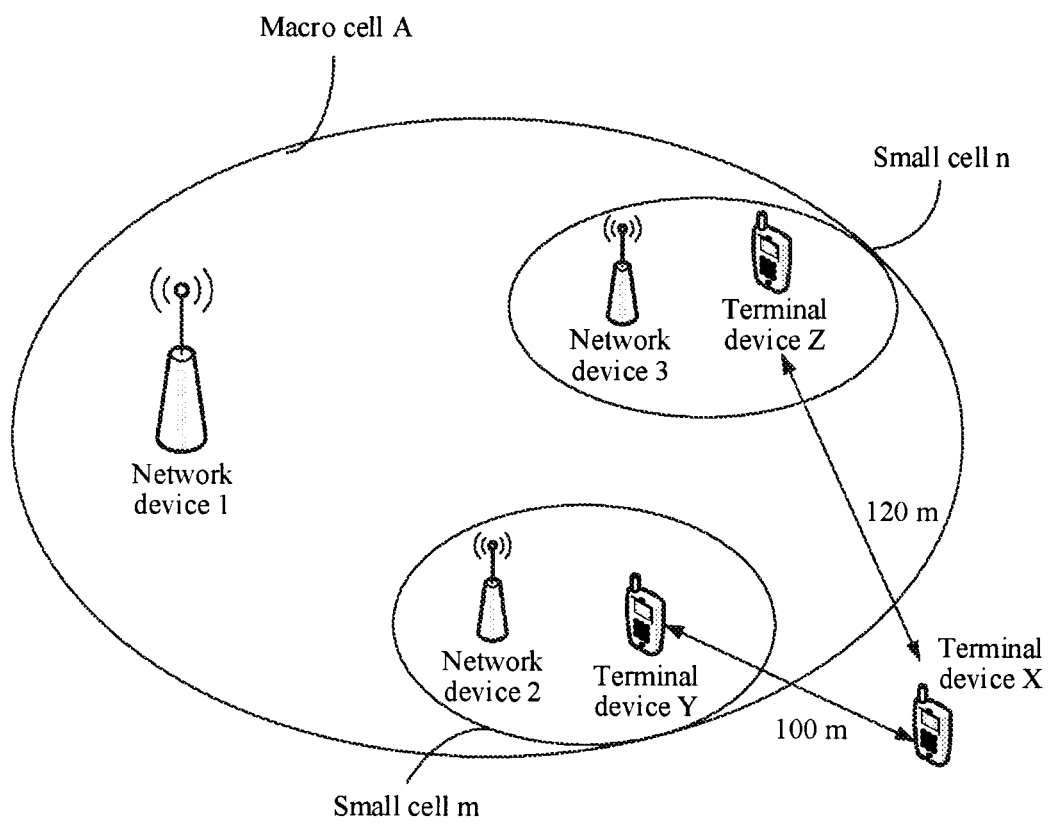
FIG. 6A is a schematic diagram of a location relationship among a terminal device A, a terminal device B, and a terminal device C according to an embodiment of this application.
Figure 6B:
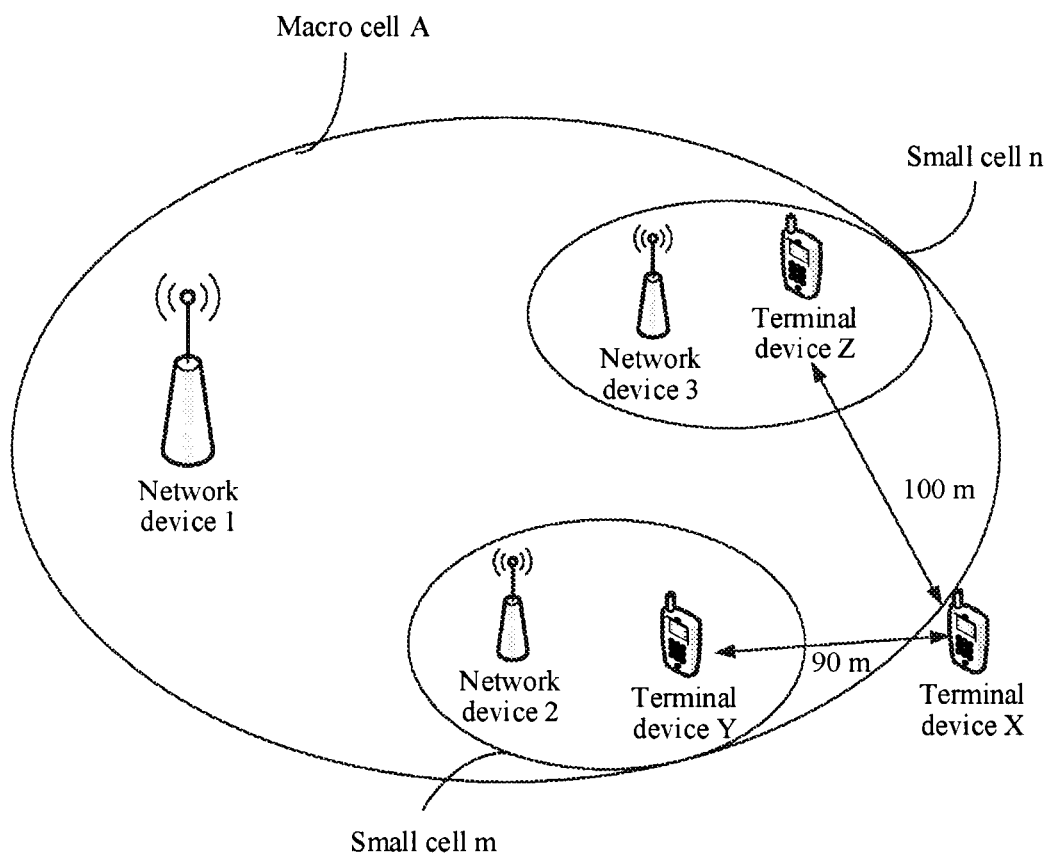
FIG. 6B is a schematic diagram of another location relationship among a terminal device A, a terminal device B, and a terminal device C according to an embodiment of this application.

After the terminal device X is powered on, the terminal device X searches, on a preconfigured frequency domain resource used for D2D communication, for example, a frequency domain resource corresponding to the carrier 5, for the historical access information broadcast by the other terminal devices. Because a transmit power of the terminal device is limited, the terminal device X can receive the historical access information only when distances between the terminal device X and the other terminal devices are less than or equal to a first preset threshold. The first preset threshold may be determined based on the transmit power of the terminal device. Specifically, the terminal device X may receive, at one location, historical access information broadcast by only one of the other terminal devices. For example, as shown in FIG. 6A, it is assumed that the preset threshold is 100 m. A distance between the terminal device X and the terminal device Y is 90 m, and a distance between the terminal device X and the terminal device Z is 120 m. Because the distance between the terminal device X and the terminal device Z is greater than the first preset threshold, in this case, the terminal device X can receive the historical access information broadcast by only the terminal device Y on the carrier 5. The terminal device X may alternatively receive, at one location, historical access information broadcast by a plurality of other terminal devices. For example, as shown in FIG. 6B, it is assumed that the preset threshold is 100 m. A distance between the terminal device X and the terminal device Y is 90 m, and a distance between the terminal device X and the terminal device Z is 100 m. Because neither the distance between the terminal device X and the terminal device Y nor the distance between the terminal device X and the terminal device Z exceeds the first preset threshold, in this case, the terminal device X can separately receive the historical access information broadcast by the terminal device Y and the terminal device Z on the carrier 5. Certainly, the terminal device X may alternatively receive historical access information from more other terminal devices. Details are not described herein.

Step 303: The terminal device X determines, based on historical access information received from one or more second terminals, whether there is a cell at the first location.

If the terminal device X receives, at the first location, first information sent by each of a plurality of nearby second terminals, only when the first information corresponding to all of the plurality of second terminals indicates that there is no cell at the first location, it may be considered that there is no cell at the first location. On the contrary, as long as first information corresponding to one of the second terminals indicates that there is a cell at the first location, it may be considered that there is a cell at the first location. It should be noted that, when the first information indicates that a cell is successfully accessed/found at the first location, it may be considered that the first information indicates that there is a cell at the first location.

In this embodiment, the first location may be a current location of the terminal device X, or may be another location different from a current location of the terminal device X. For these two cases, the following separately describes specific implementation processes of step 303.

In a first case, the first location is the current location of the terminal device X.

The terminal device X first determines the current location, for example, the location e, and then determines, based on the historical access information received from the another terminal device, whether there is a record of successful access at the current location of the terminal device X. A method for determining the current location by the terminal device X is the same as the method for determining the location d, the location e, or the location f by the terminal device Y in step 301, and details are not described herein again. Because the received historical access information has different forms, manners of determining, by the terminal device X, whether there is a record of successful access at the current location of the terminal device X are also different.

Details are as follows:

A first determining manner is as follows:

If the historical access information is in the first form or the second form in step 301, the terminal device X determines whether the received historical access information includes information about the location e. If the received historical access information includes information about the location e, the terminal device X determines that the historical access information indicates that there is a cell at the current location of the terminal device X; or if the received historical access information includes no information about the location e, the terminal device X determines that there is no cell at the current location of the terminal device X.

A second determining manner is as follows:

If the historical access information is in the third form or the fourth form in step 301, the terminal device X first determines whether the received historical access information includes information about the location e. If the received historical access information includes information about the location e, the terminal device X determines whether recorded content corresponding to the location e is information indicating that a network device is successfully accessed at the location. For example, the recorded content is "yes", "1", or a carrier frequency of a reference signal of a cell accessed at the location e and a PCI of the cell. If the recorded content indicates that a network device is successfully accessed at the location, the terminal device X determines that there is a cell at the current location of the terminal device X; or if the recorded content indicates that no network device is successfully accessed at the location, the terminal device X determines that there is no cell at the current location of the terminal device X.

A third determining manner is as follows:

If the terminal device X determines that the received historical access information includes no information about the location e or recorded content corresponding to the location e indicates that no network device is successfully accessed at the location e, the terminal device X determines whether a distance between the location e and a location at which a network device is successfully accessed exceeds a second preset threshold. The second preset threshold may be 50 m, 20 m, or the like. If the distance between the location e and the location at which a network device is successfully accessed does not exceed the second preset threshold, the terminal device X determines that there is a cell at the current location of the terminal device X; or if the distance between the location e and the location at which a network device is successfully accessed exceeds the second preset threshold, the terminal device X determines that there is no cell at the current location of the terminal device X. For example, if the location at which a network device is successfully accessed in the historical access information is the location f, the terminal device X determines that a distance between the location e and the location f is 30 m that is less than the second preset threshold 50 m. In this case, the terminal device X determines that there is a cell at the current location of the terminal device X.

It should be noted that, in the foregoing three determining manners, when the terminal device X determines, based on the historical access information, whether there is a cell at the current location, the cell may be a macro cell or may be a small cell.

A fourth determining manner is as follows:

If the historical access information is in the fifth form in step 301, the terminal device X determines, based on the historical access information, whether there is a small cell at the current location of the terminal device X.

If the terminal device X has accessed a network device by using a macro cell, for example, has accessed the network device X by using the macro cell A, the terminal device X determines, based on whether the historical access information includes a PCI of the macro cell A, whether the macro cell A includes a small cell. If the historical access information includes the PCI of the macro cell A, the terminal device X determines that the macro cell A includes a small cell; or if the historical access information includes no PCI of the macro cell A, the terminal device X determines that the macro cell A includes no small cell.

In a second case, the first location is the another location different from the current location of the terminal device X.

Because the historical access information of the terminal device Y may include access statuses at a plurality of locations, the terminal device X may also determine, based on the historical access information, whether there is a cell at the another location. For example, if the historical access information received by the terminal device X is "Access fails at the location d, and access succeeds at the location f", the terminal device X determines and records that there is no cell at the location d and there is a cell at the location f. In this way, the terminal device X pre-learns whether there is a cell at the another location. When moving to the location, the terminal device X may directly determine, based on recorded content, whether there is a cell at the location. This reduces a quantity of times of interaction between the terminal device X and another terminal device, so that energy consumption of the terminal device and time-frequency resources used for communication between the terminal devices can be reduced.

Certainly, the terminal device X may also determine, based on the historical access information, whether there is a cell at the current location of the terminal device X and whether there is a cell at the another location. A specific determining manner may be a combination of the methods in the first case and the second case. Details are not described herein again.

After step 303, in other words, after the terminal device X determines whether there is a cell at the first location, the terminal device X may choose, based on a determining result, to perform one of step 304 to step 306. Step 304 to step 306 are three different processing policies. In FIG. 3, that the terminal device X performs step 304 is used as an example.

Step 304: If the terminal device X determines that there is a cell at the first location, the terminal device X determines that a value of a search parameter at the first location is a first search parameter value, and searches for a cell based on the first search parameter value.

The following separately describes specific implementation processes of step 304 for the two cases of the first location.

In the first case, the first location is the current location of the terminal device X.

When the terminal device X determines that there is a cell at the current location of the terminal device X, the terminal device X may determine the first search parameter value for performing cell search at the current location, and then search for a cell based on the first search parameter value.

The search parameter used when the terminal device X performs cell search is first described.

In this embodiment of this application, the search parameter used for cell search includes at least one of a search carrier frequency parameter, a location change threshold parameter, a parameter of a maximum quantity of search times, and a search period parameter.

The terminal device X searches for a cell based on a search carrier frequency. Specifically, the search carrier frequency parameter may be a frequency band, for example, from 1.9 GHz to 2.2 GHz. In this case, the terminal device X searches for a cell-specific reference signal in the frequency band. Alternatively, the search carrier frequency parameter may be several preset carrier frequencies, for example, 1.9 GHz, 2.0 GHz, 2.1 GHz, and 2.2 GHz. In this case, the terminal device X searches for a cell-specific reference signal on these frequencies. To reduce energy consumption caused by searching for a cell-specific reference signal by the terminal device X, the terminal device X may perform search based on a search period. For example, the search period may be 2 s. In this case, the terminal device X searches for a cell-specific reference signal once every 2 s. A counter of the terminal device X collects statistics about a quantity of times of searching for a cell-specific reference signal at a same location. The quantity of times of searching for a cell-specific reference signal at a same location is less than or equal to a maximum quantity of search times. For example, the maximum quantity of search times is 10. After the terminal device X performs search at the current location for 10 times, the terminal device X considers that there is no cell at the location, and stops a process of searching for a cell-specific reference signal at the location. The terminal device X may be displaced in a search process. The terminal device X may monitor displacement of the terminal device X by using an apparatus such as a GPS module, an accelerometer, or a direction sensor. When the terminal device is displaced and a displacement amount is greater than or equal to a value of the location change threshold parameter, the terminal device X re-searches for a cell at a location of the terminal device X after the displacement, and re-collects statistics about a quantity of times of searching for a cell-specific reference signal. For example, the value of the location change threshold parameter is 200 m, and the terminal device X searches for a cell-specific reference signal at the current location. When the terminal device X performs search for the eighth time, the GPS module of the terminal device X detects that the terminal device X is displaced, and determines that a distance of the displacement is 100 m that is shorter than 200 m. Therefore, when the terminal device X performs search next time, a count value of the counter of the terminal device X is 9. When the terminal device X performs search for the ninth time, the GPS module of the terminal device X detects that the terminal device X is displaced, and determines that a distance of the displacement is 100 m. The terminal device X determines that accumulated displacement is 200 m which is equal to the value of the location change threshold parameter. Therefore, the terminal device X sets the count value of the counter to zero, and re-searches for a cell-specific reference signal at a location after the displacement.

It should be noted that, after the terminal device X determines that the accumulated displacement reaches the specified value of the location change threshold parameter, the terminal device X repeats step 301 to step 303 at the location after the displacement. When determining that there is a cell at the location after the displacement, the terminal device X performs cell search at the location after the displacement.

Therefore, before performing cell search, the terminal device X first determines whether there is a cell at the location. If the terminal device X determines that there is a cell at the location, the terminal device X performs cell search; or if the terminal device X determines that there is no cell at the location, the terminal device X performs no cell search. This can avoid a problem that time for accessing a network device is relatively long and energy consumption is relatively high because cell search is still performed when there is no cell at the location.

In this embodiment of this application, a method for determining, by the terminal device X, the first search parameter value for cell search may include but is not limited to the following two manners. Details are as follows:

A first determining manner is as follows:

When the terminal device X determines that there is a cell at the current location of the terminal device X, the terminal device X obtains an initial value of the search parameter for cell search, and then searches for a cell at the current location based on the initial value. In other words, in this case, the first search parameter value is the initial value of the search parameter. The initial value of the search parameter may be preconfigured by the terminal device, or may be indicated by a network device, or may be obtained in another manner. This is not limited herein.

In other words, the terminal device X performs cell search only when determining, based on the historical access information of the another terminal device, that there is a cell at the current location of the terminal device X. This can avoid an energy consumption problem caused by still performing cell search when there is no cell at the location, reduce energy consumption of the terminal device, and improve a battery life of the terminal device.

A second determining manner is as follows:

After the terminal device X determines that there is a cell at the first location, the terminal device X may adjust, based on second information, a value/values of one or more of search parameters used to search for a cell at the first location, to obtain the first search parameter value of the terminal device X at the first location. In an embodiment, the second information is the first information, that is, first information that is sent by the one or more second terminal devices and that is received by the terminal device X. The following separately describes a process in which the terminal device X determines the first search parameter value based on received first information sent by one second terminal device and a process in which the terminal device X determines the first search parameter value based on received first information sent by a plurality of second terminal devices.

(a) The process in which the terminal device X determines the first search parameter value based on the received first information sent by the one second terminal device is as follows:

For ease of description, the following uses an example in which the first information sent by the one second terminal device is the historical access information of the terminal device Y. In this search manner, the search parameter includes at least one of the search carrier frequency parameter, the location change threshold parameter, the parameter of the maximum quantity of search times, and the search period parameter, and an initial value of each search parameter is similar to that in the first determining manner. The terminal device X obtains the first search parameter value after adjusting the value of the search parameter based on the received historical access information of the terminal device Y (adjustment is performed based on the initial value of the search parameter, and for example, the initial value is increased or decreased). A method for obtaining the first search parameter value by the terminal device X may include at least one of the following three manners.

A first obtaining manner is as follows:

The historical access information of the terminal device Y indicates that there is a cell at the current location, and the terminal device X decreases a value of the search period parameter in the plurality of search parameters, and/or increases a value of the parameter of the maximum quantity of search times in the plurality of search parameters. In other words, the terminal device X may only decrease the value of the search period parameter, or the terminal device X may only increase the value of the parameter of the maximum quantity of search times, or the terminal device X may decrease the value of the search period parameter and increase the value of the parameter of the maximum quantity of search times.

In an example, the value of the search period parameter in the search parameters is 2 s. After determining that there is a cell at the current location, the terminal device X decreases the value of the search period parameter to 1 s or 1.5 s. Values of the other parameters in the search parameters do not change. In this way, after the terminal device X decreases the value of the search period parameter in the search parameters, a cell search speed of the terminal device X can be increased, and cell search time can be reduced.

In an example, the value of the parameter of the maximum quantity of search times in the search parameters is 10 times. After determining that there is a cell at the current location, the terminal device X increases the value of the parameter of the maximum quantity of search times to 15 times or 20 times. Values of the other parameters in the search parameters do not change. In this way, after the terminal device X increases the value of the parameter of the maximum quantity of search times in the search parameters, the terminal device X can perform cell search a plurality of times at the location at which the terminal device X determines that there is a cell, and a cell search success rate can be improved.

In an example, when the terminal device X determines that there is a cell at the current location, the terminal device X may decrease the value of the search period parameter in the search parameters and increase the value of the parameter of the maximum quantity of search times in the search parameters, so that a cell search speed of the terminal device X can be increased, cell search time can be reduced, and a cell search success rate can be improved by increasing a quantity of times that the terminal device X performs cell search at the location at which the terminal device X determines that there is a cell. A specific obtaining manner is similar to that in corresponding content in the foregoing two examples, and details are not described herein again.

It should be noted that, in the foregoing obtaining manner, the terminal device X may adjust the value of the parameter according to a preset rule. The preset rule may be that the search period parameter is adjusted by 0.5 s each time, and the maximum quantity of search times is adjusted by five times each time. Alternatively, the preset rule may be as follows: When the terminal device X determines that there is a cell at the current location of the terminal device X, the terminal device X adjusts the value of the search period parameter to a fixed value 1 s and/or adjusts the value of the parameter of the maximum quantity of search times to a fixed value 20 times. Certainly, the preset rule may alternatively be other content. This is not limited herein.

A second obtaining manner is as follows:

The historical access information of the terminal device Y indicates that a cell is successfully accessed/found at the first location and indicates one or more cells successfully accessed/found at the first location, the historical access information includes related information of the one or more successfully accessed/found cells, and the related information of the cell includes a carrier frequency of the cell. For example, when the historical access information of the terminal device Y is in the second form or the fourth form in step 301, the historical access information further includes a carrier frequency of an accessed cell. Therefore, when the terminal device X determines that there is a cell at the current location, and determines, in the historical access information, a carrier frequency of a cell accessed by the terminal device Y at the current location, the terminal device X adjusts a value of the search carrier frequency parameter included in the plurality of search parameters to a value/values of the carrier frequency/carrier frequencies of the one or more cells that are successfully accessed/found at the first location and that are indicated in the historical access information. For example, the value of the search carrier frequency parameter in the search parameters ranges from 1.9 GHz to 2.2 GHz. After determining that there is a cell at the current location and determining that a carrier frequency of the cell corresponding to the location is 2.0 GHz, the terminal device X sets the value of the search carrier frequency parameter to 2.0 GHz. Values of the other parameters in the search parameters do not change. In this way, the terminal device X can quickly locate the carrier frequency of the cell, so that time of performing search on a plurality of carrier frequencies can be reduced.

It should be noted that, because the historical access information of the terminal device Y may include information about a plurality of cells at a same location, the terminal device X may adjust the value of the search carrier frequency parameter based on the information about the plurality of cells. If the historical access information of the terminal device Y records frequencies of a plurality of cells at a same location, for example, a frequency of the macro cell A is 2.0 GHz, a frequency of the macro cell B is 2.5 GHz, and a frequency of a macro cell C is 3.0 GHz, the terminal device X may sequentially set the value of the search carrier frequency parameter to the frequencies of the plurality of cells, so that the terminal device X performs search in a traversal manner based on the frequencies of the plurality of cells. For example, the terminal device X may first set the value of the search carrier frequency parameter to 2.0 GHz, and then perform cell search. Then, the terminal device X sets the value of the search carrier frequency parameter to 2.5 GHz, and performs cell search. Finally, the terminal device X sets the value of the search carrier frequency parameter to 3.0 GHz, and performs cell search. In this way, when the second information indicates related information of a plurality of cells at the first location, the terminal device X may search for the plurality of cells in a traversal manner, or the terminal device X may search for the plurality of cells in sequence and may stop searching for the other cells after finding one cell.

A third obtaining manner is as follows:

The historical access information of the terminal device Y indicates that a cell is successfully accessed/found at the first location and indicates one or more cells successfully accessed/found at the first location, the historical access information includes related information of the one or more successfully accessed/found cells, and the related information of the cell includes a carrier frequency of the cell. For example, when the historical access information of the terminal device Y is in the second form or the fourth form in step 301, the historical access information further includes a carrier frequency of an accessed cell. Therefore, if the terminal device X determines that there is a cell at the current location, and determines, in the historical access information, a carrier frequency of a cell accessed by the terminal device Y at the current location, the terminal device X decreases a value of the location change threshold parameter in the search parameters when the terminal device X determines that the carrier frequency indicated in the historical access information is greater than or equal to a first preset value, where the first preset value is a preset search carrier frequency; or the terminal device X increases a value of the location change threshold parameter in the search parameters when the terminal device X determines that the carrier frequency indicated in the historical access information is less than a second preset value, where the second preset value is also a preset search carrier frequency. It should be noted that the first preset value and the second preset value may be the same or may be different. This is not limited herein.

Specifically, if the search carrier frequency specified in the search parameters is a frequency band, for example, from 10 GHz to 50 GHz, the preset carrier frequency may be an intermediate frequency of the frequency band, for example, 30 GHz. If the search carrier frequency specified in the search parameters is several frequencies, for example, 10 GHz, 15 GHz, 20 GHz, 30 GHz, and 50 GHz, the preset carrier frequency may be a frequency at a middle location in the several frequencies, for example, 20 GHz. Certainly, the preset carrier frequency may alternatively be determined in another manner. This is not limited herein.

For example, the preset carrier frequency is 20 GHz. If the terminal device X determines, based on the historical access information, that there is a cell at the current location and a carrier frequency of the cell corresponding to the location is 30 GHz, because 30 GHz>20 GHz, the value of the location change threshold parameter may be decreased from 100 m in the search parameters to 80 m. If the terminal device X determines, based on the historical access information, that there is a cell at the current location and a carrier frequency of the cell corresponding to the location is 15 GHz, because 15 GHz<20 GHz, the value of the location change threshold parameter may be increased from 100 m in the search parameters to 120 m.

It should be noted that, because the historical access information of the terminal device Y may include information about a plurality of cells at a same location, the terminal device X may adjust the value of the location change threshold parameter based on the information about the plurality of cells. If the historical access information of the terminal device Y records frequencies of a plurality of cells at a same location, for example, a frequency of the macro cell A is 2.0 GHz, and a frequency of the small cell m is 10 GHz, the terminal device X may determine two values of the location change threshold parameter based on the two carrier frequencies. For example, the value of the location change threshold parameter is determined as 120 m based on the frequency of the macro cell A, and the value of the location change threshold parameter is determined as 80 m based on the frequency of the small cell m. In this case, when a carrier frequency used by the terminal device X to search for a cell is a low frequency, the terminal device may set the value of the location change threshold parameter to the value determined based on the macro cell A. When a carrier frequency used by the terminal device X to search for a cell is a high frequency, the terminal device may set the value of the location change threshold parameter to the value determined based on the small cell m. The terminal device X may perform selection based on an actual situation.

When adjusting the value of the location change threshold parameter in the search parameters based on the carrier frequency, the terminal device X may perform adjustment by a preset distance value each time, for example, perform adjustment by 20 m each time, or may directly adjust the value of the location change threshold parameter to a preset fixed value. Certainly, another manner may alternatively be used. This is not limited herein.

In addition, the second obtaining manner and the third obtaining manner may be combined. For example, when the historical access information of the terminal device Y is in the second form or the fourth form, the historical access information further includes information about an accessed cell. Therefore, when the terminal device X determines that there is a cell at the current location, and determines, in the historical access information, a carrier frequency of a cell accessed by the terminal device Y at the current location, the terminal device X adjusts the value of the search carrier frequency parameter and the value of the location change threshold parameter in the search parameters based on the carrier frequency. A specific obtaining manner is the same as that in corresponding content in the second obtaining manner and the third obtaining manner, and details are not described herein again. In this case, if the historical access information of the terminal device Y indicates that information about a plurality of cells is included at a same location, the terminal device X may adjust the value of the search carrier frequency parameter and the value of the location change threshold parameter based on the information about the plurality of cells. For example, if the historical access information of the terminal device Y records frequencies of a plurality of cells at a same location, for example, a frequency of the macro cell A is 2.0 GHz, and a frequency of the small cell m is 10 GHz, the terminal device X may sequentially set the value of the search carrier frequency parameter to the frequencies of the plurality of cells. Then, when a cell is searched for by using a corresponding carrier frequency, the value of the location change threshold parameter is set to a value, determined based on the carrier frequency, of the location change threshold parameter. For example, if the value of the location change threshold parameter is determined as 120 m based on the frequency of the macro cell A, and the value of the location change threshold parameter is determined as 80 m based on the frequency of the small cell m, when the value of the search carrier frequency parameter of the terminal device X is 2.0 GHz, the terminal device X sets the value of the location change threshold parameter to 120 m, and then performs cell search. When the terminal device X sets the value of the search carrier frequency parameter to 10 GHz, the terminal device X sets the value of the location change threshold parameter to 80 m, and performs cell search until a cell is found.

(b) The process in which the terminal device X determines the value of the search parameter based on the received first information sent by the plurality of second terminal devices is as follows:

When the terminal device X receives the first information sent by the plurality of second terminal devices, the terminal device X needs to determine the value of the search parameter based on the plurality of pieces of first information. For ease of description, the following uses an example in which the plurality of second terminal devices may be the terminal device Y and the terminal device Z. A method by using which the terminal device X adjusts the value of the search parameter based on the received historical access information of the terminal device Y and the received historical access information of the terminal device Z may include at least one of the following three manners.

A first obtaining manner is as follows:

As long as the historical access information of any one or more of the terminal device Y and the terminal device Z indicates that there is a cell at the current location, the terminal device X decreases a value of the search period parameter in the plurality of search parameters, and/or increases a value of the parameter of the maximum quantity of search times in the plurality of search parameters. A specific obtaining manner is similar to the first obtaining manner in the case (a), and details are not described herein again.

A second obtaining manner is as follows:

If the historical access information of the terminal device Y and/or the terminal device Z indicates that a cell is successfully accessed/found at the first location and indicates one or more cells successfully accessed/found at the first location, the historical access information includes related information of the one or more successfully accessed/found cells, and the related information of the cell includes a carrier frequency of the cell, the terminal device X adjusts a value of the search carrier frequency parameter included in the plurality of search parameters to a value/values of the carrier frequency/carrier frequencies of the one or more cells that are successfully accessed/found at the first location and that are indicated in the historical access information.

When the historical access information of only one of the terminal device Y and the terminal device Z indicates that a cell is successfully accessed/found at the first location, and the historical access information includes related information of one or more successfully accessed/found cells, the terminal device X needs to determine a value of the search carrier frequency parameter based on the historical access information of only the terminal device. This process is the same as the second obtaining manner in the case (a), and details are not described herein again.

When the historical access information of both the terminal device Y and the terminal device Z indicates that a cell is successfully accessed/found at the first location, and each piece of historical access information includes related information of one or more successfully accessed/found cells, cell-related information included in the historical access information of the terminal device Y may be the same as or different from cell-related information included in the historical access information of the terminal device Z. When the historical access information of the plurality of terminal devices includes same cell-related information, this process is the same as the second obtaining manner in the case (a). Details are not described herein again. When the historical access information of the plurality of terminal devices includes different cell-related information, for example, the historical access information of the terminal device Y includes a frequency 2.0 GHz of the macro cell A accessed at the first location, and the historical access information of the terminal device Z includes a frequency 2.5 GHz of the macro cell B accessed at the first location, the terminal device X may sequentially set the value of the search carrier frequency parameter to the frequencies of the plurality of cells, so that the terminal device X performs search in a traversal manner based on the frequencies of the plurality of cells. This process is similar to a corresponding process in the case (a), and details are not described herein again.

A third obtaining manner is as follows:

If the historical access information of the terminal device Y and/or the terminal device Z indicates that a cell is successfully accessed/found at the first location and indicates one or more cells successfully accessed/found at the first location, the historical access information includes related information of the one or more successfully accessed/found cells, and the related information of the cell includes a carrier frequency of the cell, the terminal device X determines the value of the location change threshold parameter based on a value relationship between a first preset value and a carrier frequency indicated in each piece of the historical access information of the plurality of terminal devices, and a value relationship between a second preset value and the carrier frequency indicated in each piece of the historical access information. This process may be similar to the process of determining the value of the location change threshold parameter when the historical access information of the terminal device Y includes the information about the plurality of cells in the case (a), and details are not described herein again.

In the second case, the first location is the another location different from the current location of the terminal device X.

If the terminal device X determines, based on the received historical access information of the terminal device Y, that there is a cell at the another location different from the current location of the terminal device X, when the terminal device X moves to the another location, the terminal device X may perform cell search in one of the manners in the first case. Details are not described herein again.

Step 305: If the terminal device X determines that there is no cell at the first location, prohibit the terminal device X from performing cell search at the first location.

In this embodiment of this application, when the terminal device X determines, based on received second information, that there is no cell at the current location of the terminal device X, in other words, the second information indicates that no cell is successfully accessed/found at the first location, it may be considered that the second information indicates that there is no cell at the first location. In this case, the terminal device X is prohibited from performing cell search at the current location. If the terminal device X determines that there is no cell at the another location different from the current location of the terminal device X, when the terminal device X moves to the another location, the terminal device X is prohibited from performing cell search at the another location. The second information is the same as the second information in step 304, namely, the historical access information of the terminal device Y.

Certainly, when the second information is historical access information of a plurality of terminal devices, if each of the plurality of pieces of historical access information indicates that no cell is successfully accessed/found at the first location, the terminal device X determines that there is no cell at the first location, so that the terminal device X is prohibited from performing cell search at the first location.

Step 306: If the terminal device X determines that there is no cell at the first location, the terminal device X searches for a cell at the first location based on a second search parameter.

The following separately describes specific implementation processes of step 306 for the two cases of the first location.

In the first case, the first location is the current location of the terminal device X.

When the terminal device X determines that there is no cell at the current location, the terminal device X obtains the search parameter for cell search, then adjusts, based on received second information, a value/values of the search period parameter and/or the parameter of the maximum quantity of search times in the search parameter for cell search, to obtain the second search parameter value, and searches for a cell at the current location based on the second search parameter value. The second information is the same as the second information in step 304 and step 305, and details are not described herein again.

For example, the terminal device X determines the value of the search parameter based on received first information sent by one second terminal device, and the second terminal device is the historical access information of the terminal device Y. A process in which the terminal device X obtains the second search parameter value based on the received second information includes but is not limited to the following three manners.

A first obtaining manner is as follows:

If the historical access information of the terminal device Y indicates that there is no cell at the current location, the terminal device X may increase the value of the search period parameter in the search parameters. For example, the value of the search period parameter in the search parameters is 2 s. After determining that there is no cell at the current location, the terminal device X increases the value of the search period parameter to 3 s or 4 s. Values of the other parameters in the search parameters do not change. Therefore, a quantity of times that the terminal device X searches for a cell per unit time can be reduced, and energy consumption required by the terminal device to search for a cell per unit time can be reduced.

A second obtaining manner is as follows:

If the historical access information of the terminal device Y indicates that there is no cell at the current location, the terminal device X may decrease the value of the parameter of the maximum quantity of search times in the search parameters. For example, the value of the parameter of the maximum quantity of search times in the search parameters is 10 times. After determining that there is no cell at the current location, the terminal device X decreases the value of the parameter of the maximum quantity of search times to five times or six times. Values of the other parameters in the search parameters do not change. Therefore, a quantity of times that the terminal device X performs cell search at the location at which the terminal device X determines that there is no cell can be reduced, and energy consumption required by the terminal device X to perform cell search and cell search time can be reduced.

A third obtaining manner is as follows:

If the historical access information of the terminal device Y indicates that there is no cell at the current location, the terminal device X may increase the value of the search period parameter in the search parameters and decrease the value of the parameter of the maximum quantity of search times in the search parameters. Therefore, energy consumption required by the terminal device X to perform cell search and cell search time can be reduced. A specific obtaining manner is the same as that in corresponding content in the first obtaining manner and the second obtaining manner in step 306, and details are not described herein again.

It should be noted that, in the foregoing three obtaining manners, the terminal device X may adjust the value of the parameter according to a preset rule. The preset rule may be that the search period parameter is adjusted by 0.5 s each time, and the maximum quantity of search times is adjusted by five times each time. Alternatively, the preset rule may be as follows: When the terminal device X determines that there is no cell at the current location of the terminal device X, the value of the search period parameter is adjusted to a fixed value 3 s and/or the value of the parameter of the maximum quantity of search times is adjusted to a fixed value 5 times. Certainly, the preset rule may alternatively be other content. This is not limited herein.

In addition, it should be noted that, that the terminal device X obtains the second search parameter value based on first information sent by a plurality of second terminal devices is similar to corresponding content in step 304, and details are not described herein again.

In the second case, the first location is the another location different from the current location of the terminal device X.

If the terminal device X determines, based on the received historical access information of the terminal device Y, that there is no cell at the another location different from the current location of the terminal device X, when the terminal device X moves to the another location, the terminal device X may perform cell search in one of the manners in the first case in step 306. Details are not described herein again.

Step 307: The terminal device X broadcasts and/or stores a search result.

In this embodiment of this application, the search result is used to indicate information about the cell successfully accessed/found at the first location, or the search result is used to indicate that no cell is found at the first location.

After the terminal device X performs cell search at the current location in the manner in step 304 or step 306, if the terminal device X successfully finds a cell at the current location, for example, finds the small cell m, the terminal device X accesses the network device 2 by using the small cell m, and then records a carrier frequency of the small cell m, the current location of the terminal device X, and a PCI of the network device 2 corresponding to the small cell m. Then, information about the accessed small cell m, for example, the carrier frequency of the small cell m, is broadcast in a manner such as D2D, Wi-Fi, or Bluetooth.

If a quantity of times that the terminal device X searches for a cell at the current location reaches the maximum quantity of search times in the search parameters, but still no cell can be found, the terminal device X may also record the current location of the terminal device X and information indicating that there is no cell at the location, and then broadcast, in a manner such as D2D, Wi-Fi, or Bluetooth, a message indicating that there is no cell at the current location of the terminal device X.

Certainly, the terminal device X may determine, based on a setting of a user or a running parameter (such as remaining battery power), whether the search result needs to be broadcast. For example, when the user sets a sharing function to being disabled, the terminal device X stops broadcasting the search result. When the battery power of the terminal device X is relatively low, the terminal device X may automatically stop broadcasting the search result. The terminal device X may also determine, based on a factor such as remaining space of memory, whether the search result needs to be stored. For example, if space of the memory used to store the search result in the terminal device X is full, the terminal device may not store the search result, or the terminal device X may store, after deleting a previously stored search result or deleting a most rarely used search result, the search result obtained at the current location.

It should be noted that step 307 is an optional step, in other words, step 307 is not mandatory.

In the foregoing technical solution, before searching for a cell, the terminal device may determine, with reference to the historical access information of the another terminal device, whether there is a cell at the location. If there is a cell, the terminal device may adjust the search parameter to accelerate a search. If there is no cell, the terminal device may perform no search, or adjust the search parameter to reduce an unnecessary cell search performed by the terminal device, so that power consumption of the terminal device can be reduced.

Figure 7:
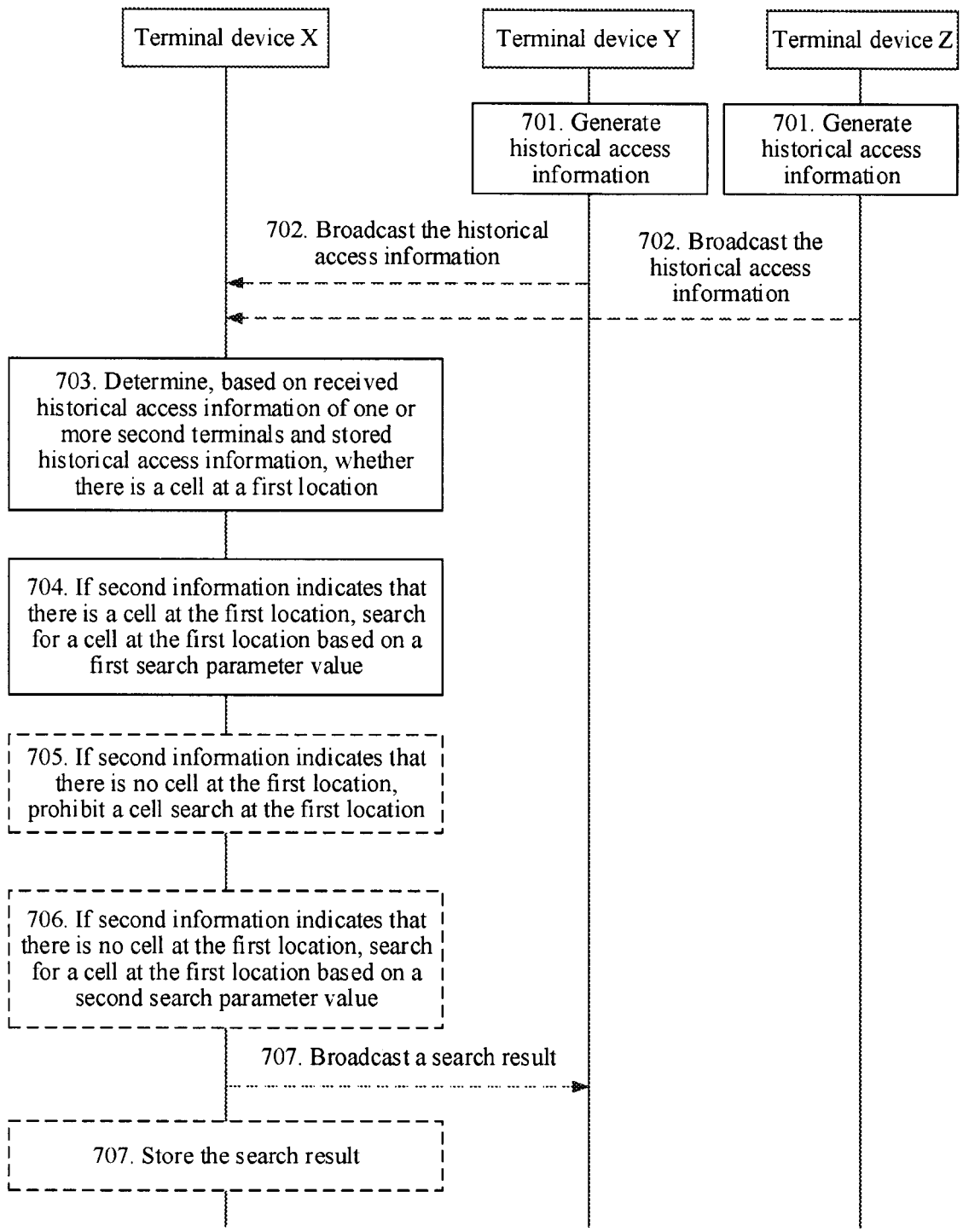
FIG. 7 is a flowchart of another cell search method according to an embodiment of this application.

In the foregoing embodiment, the terminal device searches for a cell based on only the historical access information broadcast by the another terminal device. To improve robustness of searching for a cell by a terminal device, another embodiment of this application provides a cell search method. FIG. 7 is a flowchart of the method. In the following description process, the technical solutions provided in the embodiments of this application are applied to an application scenario shown in FIG. 1B, and a cell search process of one of the terminal devices in the communications system shown in FIG. 1B, for example, a cell search process of the terminal device X is used as an example for description. The flowchart of the method is described as follows:

Step 701: Another terminal device generates historical access information.

Step 702: The another terminal device broadcasts the historical access information, and the terminal device X receives the historical access information.

Step 701 and step 702 are similar to step 301 and step 302.

Step 703: The terminal device X determines, based on historical access information received from one or more second terminals and stored historical access information of the terminal device X, that there is a cell at a first location.

In this embodiment of this application, the terminal device X may also store the historical access information, and the historical access information includes information about an accessed cell, for example, information about all cells accessed by the terminal device X before the terminal device X is powered off, so that when the terminal device is powered on again, the historical access information can be obtained. Content of the historical access information of the terminal device X is the same as the historical access information of the another terminal device in step 301, and details are not described herein again.

Then, the terminal device X may determine, by using the method in step 303 based on the historical access information of the one or more second terminals and the historical access information stored by the terminal device X, whether there is a cell at the first location. The one or more second terminals may be the other terminal devices in step 702, namely, the terminal device Y and the terminal device Z.

In an example, if one piece of historical access information in the received historical access information of the another terminal device and the historical access information stored by the terminal device X (namely, second information) indicates that there is a cell at the first location, the terminal device X determines that there is a cell at the first location. Otherwise, if both the received historical access information of the another terminal device and the historical access information stored by the terminal device X indicate that there is no cell at the first location, the terminal device X determines that there is no cell at the first location.

In another example, if each piece of historical access information in the received historical access information of the another terminal device and the historical access information stored by the terminal device X indicates that there is a cell at the first location, the terminal device X determines that there is a cell at the first location. Otherwise, if each piece of historical access information indicates that there is no cell at the first location, the terminal device X determines that there is no cell at the first location.

It should be noted that, in this case, first information is the received historical access information of the another terminal device, and the second information includes the first information and the historical access information stored by the terminal device X. A definition of the first location is the same as that in step 303, and details are not described herein again.

Step 704: If the second information indicates that there is a cell at the first location, the terminal device X searches for a cell at the first location based on a first search parameter value.

Step 705: If the second information indicates that there is no cell at the first location, the terminal device X prohibits the terminal device X from performing cell search at the first location.

Step 706: If the second information indicates that there is no cell at the first location, the terminal device X searches for a cell at the first location based on a second search parameter value.

Step 707: The terminal device X broadcasts and/or stores a search result.

Step 704 to step 707 are similar to step 304 to step 307, and details are not described herein again.

In the foregoing technical solution, before searching for a cell, the terminal device may determine, with reference to both the historical access information of the another terminal device and the historical access information stored by the terminal device, whether there is a cell at the location, so that robustness of the foregoing cell search method can be improved.

Figure 8:
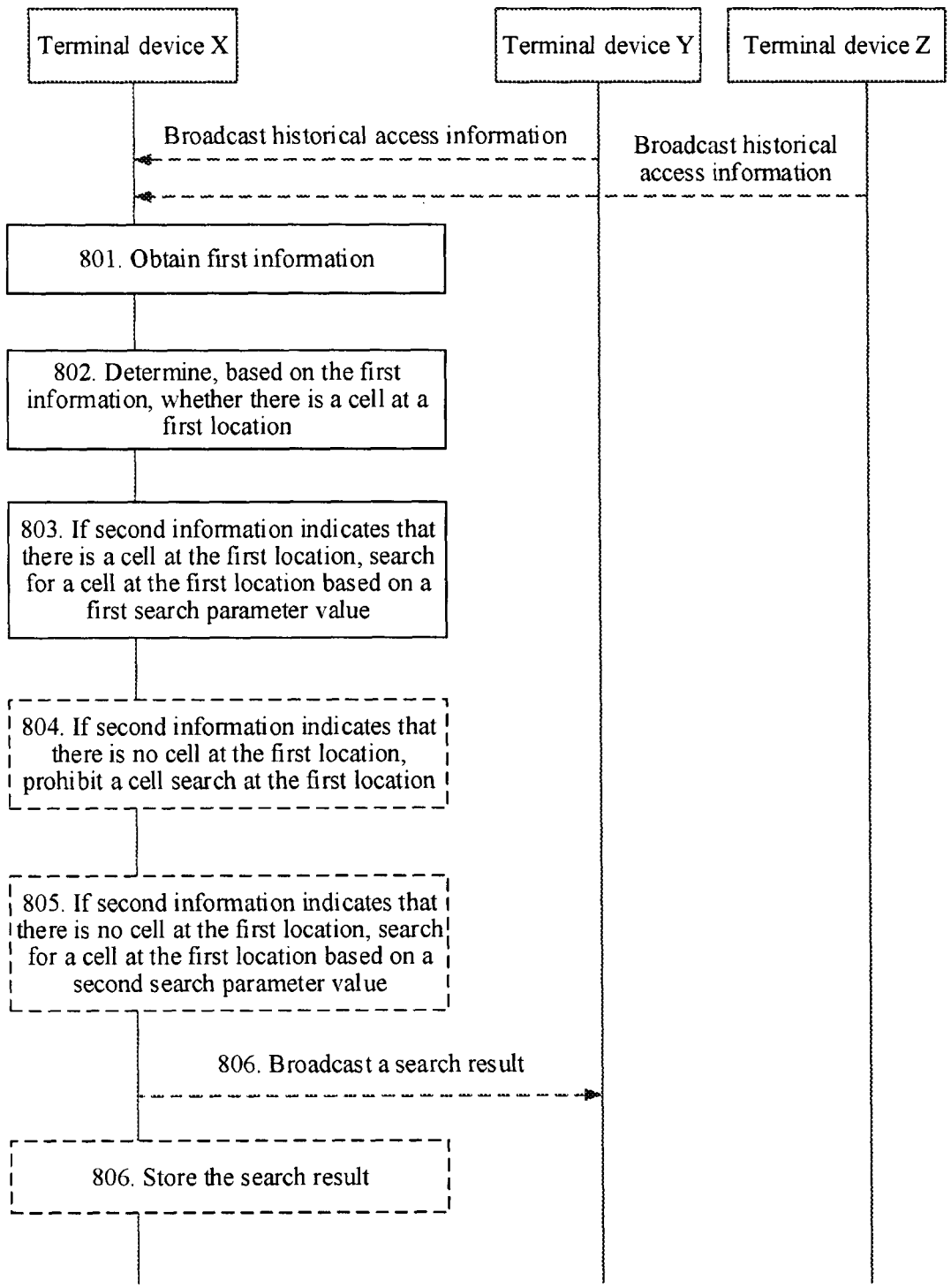
FIG. 8 is a flowchart of another cell search method according to an embodiment of this application.

In the foregoing technical solution, the terminal device needs to depend on the historical access information broadcast by the another terminal device to search for a cell. To reduce dependency on another terminal device, another embodiment provides a cell search method. FIG. 8 is a flowchart of the method. In the following description process, the technical solutions provided in the embodiments of this application are applied to an application scenario shown in FIG. 1B, and a cell search process of one of the terminal devices in the communications system shown in FIG. 1B, for example, a cell search process of the terminal device X is used as an example for description. The flowchart of the method is described as follows:

Step 801: The terminal device X obtains first information.

In this embodiment, the first information includes the following two cases.

A first case is as follows:

If another terminal device broadcasts no historical access information, or if another terminal device broadcasts historical access information but the terminal device X does not receive the historical access information, the terminal device X obtains historical access information stored by the terminal device X. The historical access information stored by the terminal device X is the first information.

A second case is as follows:

If the terminal device X determines that no historical access information broadcast by another terminal device is received within preset duration, the terminal device X generates the first information. The first information indicates that the terminal device receives no historical access information broadcast by the another terminal device.

Step 802: The terminal device X determines, based on the first information, whether the historical access information indicates that there is a cell at a first location.

For example, in the first case in step 801, the terminal device X may determine, by using the method in step 303 based on the historical access information stored by the terminal device X, whether there is a cell at the first location. If the historical access information stored by the terminal device X indicates that there is a cell at the first location, the terminal device X determines that there is a cell at the first location. If the historical access information stored by the terminal device X indicates that there is no cell at the first location, the terminal device X determines that there is no cell at the first location. A definition of the first location is the same as that in step 303, and details are not described herein again.

In the second case in step 801, the terminal device X may directly determine, based on the first information, that there is no cell at the first location. It should be noted that, in this case, the first location is a current location of the terminal device X.

Step 803: If the second information indicates that there is a cell at the first location, the terminal device X searches for a cell at the first location based on a first search parameter value.

Step 804: If the second information indicates that there is no cell at the first location, the terminal device X prohibits the terminal device X from performing cell search at the first location.

Step 805: If the second information indicates that there is no cell at the first location, the terminal device X searches for a cell at the first location based on a second search parameter value.

Step 806: The terminal device X broadcasts and/or stores a search result.

In this embodiment, the second information is the first information in step 801. Step 803 to step 806 are the same as step 304 to step 307, and details are not described herein again.

In the foregoing technical solution, when the terminal device receives no historical access information broadcast by the another terminal device, the terminal device can also search for a cell based on the historical access information stored by the terminal device or the first information generated by the terminal device. A processing manner is simple, and operation complexity of the terminal device can be reduced.

In the foregoing embodiments, the methods provided in the embodiments are separately described from perspectives of the first terminal, the second terminal, and interaction between the first terminal and the second terminal. To implement functions in the methods provided in the embodiments, the first terminal or the second terminal may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on a specific application and a design constraint condition of the technical solution.

Figure 9:
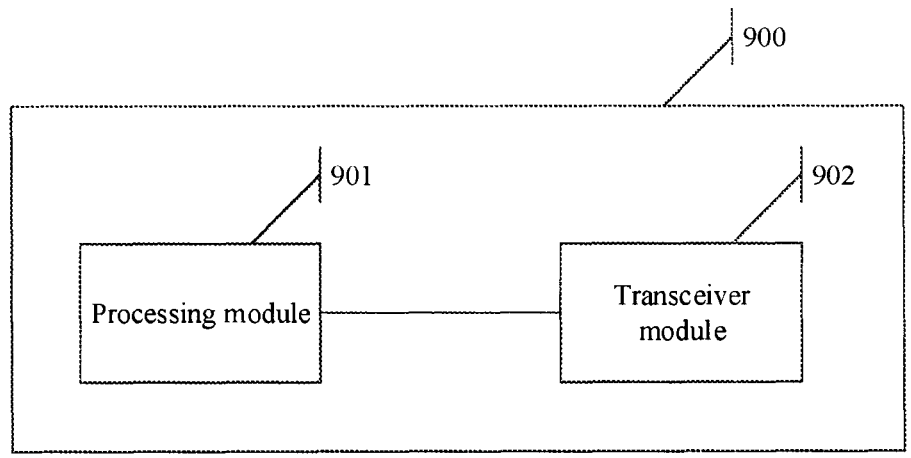
FIG. 9 is a schematic structural diagram of a communications apparatus according to an embodiment of this application.

FIG. 9 is a schematic structural diagram of a communications apparatus 900. The communications apparatus 900 may be a terminal, and can implement a function of the first terminal in the methods provided in the embodiments of this application. Alternatively, the communications apparatus 900 may be an apparatus that can support a terminal in implementing a function of the first terminal in the methods provided in the embodiments of this application. The communications apparatus 900 may be a hardware structure, a software module, or a combination of the hardware structure and the software module. The communications apparatus 900 may be implemented by a chip system. In this embodiment of this application, the chip system may include a chip, or may include a chip and another discrete component.

The communications apparatus 900 may include a processing module 901 and a transceiver module 902.

The processing module 901 may be configured to perform step 303 to step 307 in the embodiment shown in FIG. 3, or configured to perform step 703 to step 707 in the embodiment shown in FIG. 7, and/or configured to support another process of the technology described in this specification. The transceiver module 902 is configured to perform communication between the communications apparatus 900 and another module, and may be a circuit, a component, an interface, a bus, a software module, a transceiver, or any other apparatus that can implement communication.

The transceiver module 902 may be configured to perform step 302 and step 307 in the embodiment shown in FIG. 3, or configured to perform step 702 and step 707 in the embodiment shown in FIG. 7, and/or configured to support another process of the technology described in this specification.

All related content of the steps in the foregoing method embodiments may be cited in function descriptions of the corresponding function modules. Details are not described herein again.

In the embodiments of this application, division into the modules is an example, and is merely logical function division. In an actual implementation, there may be another division manner. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 10:
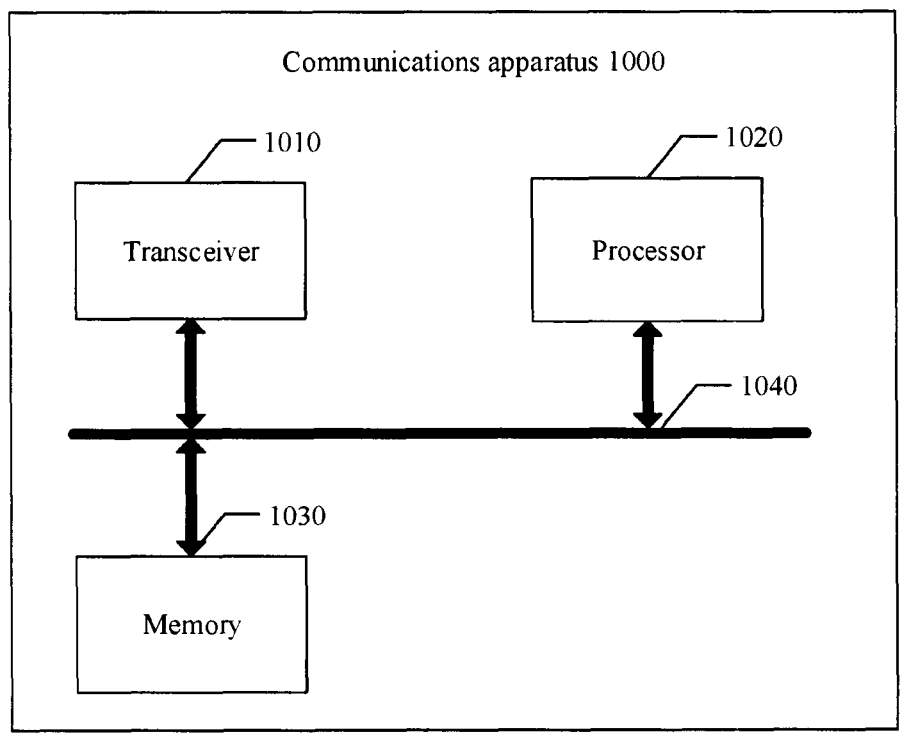
FIG. 10 is a schematic structural diagram of another communications apparatus according to an embodiment of this application.

FIG. 10 shows a communications apparatus 1000 according to an embodiment of this application. The communications apparatus 1000 may be the first terminal in the embodiment shown in FIG. 3, FIG. 7, or FIG. 8, and can implement a function of the first terminal in the methods provided in the embodiments of this application. Alternatively, the communications apparatus 1000 may be an apparatus that can support the first terminal in implementing a function of the first terminal in the methods provided in the embodiments of this application. The communications apparatus 1000 may be a chip system. In this embodiment of this application, the chip system may include a chip, or may include a chip and another discrete component.

The communications apparatus 1000 includes at least one processor 1020, configured to implement or support the communications apparatus 1000 in implementing a function of the first terminal in the methods provided in the embodiments of this application. For example, the processor 1020 may determine whether there is a cell at the first location. For details, refer to the detailed descriptions in the method examples. Details are not described herein again.

The communications apparatus 1000 may further include at least one memory 1030, configured to store a program instruction and/or data. The memory 1030 is coupled to the processor 1020. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1020 may cooperate with the memory 1030. The processor 1020 may execute the program instruction stored in the memory 1030. At least one of the at least one memory may be included in the processor.

The communications apparatus 1000 may further include a transceiver 1010, configured to communicate with another device by using a transmission medium, so that an apparatus in the communications apparatus 1000 may communicate with the another device. For example, the another device may be a second terminal. The processor 1020 may receive data and send data by using the transceiver 1010.

In this embodiment of this application, a specific connection medium among the transceiver 1010, the processor 1020, and the memory 1030 is not limited. In this embodiment of this application, the memory 1030, the processor 1020, and the transceiver 1010 are connected by using a bus 1040 in FIG. 10. The bus is represented by using a thick line in FIG. 10. The foregoing is merely an example for description. A connection manner between other components is not limited thereto. The bus may be classified into an address bus, a data bus, a control bus, and the like. For ease of representation, only one thick line is used to represent the bus in FIG. 10, but this does not mean that there is only one bus or only one type of bus.

In this embodiment of this application, the processor 1020 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the methods disclosed with reference to the embodiments of this application may be directly performed by a hardware processor, or may be performed by using a combination of hardware in the processor and a software module.

In this embodiment of this application, the memory 1030 may be a non-volatile memory, such as a hard disk drive (hard disk drive, HDD) or a solid-state drive (solid-state drive, SSD), or may be a volatile memory (volatile memory), such as a random access memory (random access memory, RAM). The memory is any other medium that can carry or store expected program code in a form of an instruction or a data structure and that can be accessed by a computer, but is not limited thereto. The memory in this embodiment of this application may be alternatively a circuit or any other apparatus that can implement a storage function, and is configured to store a program instruction and/or data.

An embodiment of this application further provides a computer-readable storage medium, including an instruction. When the instruction is run on a computer, the computer is enabled to perform the method performed by the first terminal in any one of the embodiments in FIG. 3, FIG. 7, and FIG. 8.

An embodiment of this application further provides a computer program product, including an instruction. When the computer program product is run on a computer, the computer is enabled to perform the method performed by the first terminal in any one of the embodiments in FIG. 3, FIG. 7, and FIG. 8.

An embodiment of this application provides a chip system. The chip system includes a processor, may further include a memory, and is configured to implement a function of the first terminal in the foregoing methods. The chip system may include a chip, or may include a chip and another discrete component.

All or some of the methods in the embodiments of this application may be implemented by using software, hardware, firmware, or any combination thereof. When software is used to implement the methods, the methods may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clear that, a person skilled in the art can make various modifications and variations to this application without departing from the scope of this application. In this way, this application is intended to cover these modifications and variations of this application provided that they fall within the scope of protection defined by the following claims of this application and their equivalent technologies.

What is claimed is:

1. A cell search method, comprising:
   obtaining, by a first terminal, first information before searching for a cell at a first location, wherein the first information comprises historical access information that is obtained from one or more second terminals near the first terminal in a short-distance communication manner and that corresponds to each second terminal at the first location, wherein historical access information corresponding to the first location indicates whether there is a cell at the first location;
   determining, by the first terminal, a value of a search parameter of the first terminal at the first location based on second information, wherein the second information comprises the first information; and
   searching, by the first terminal, for a cell at the first location based on the value of the search parameter.

2. The method according to claim 1, wherein the second information further comprises historical access information that is stored by the first terminal and that corresponds to the first terminal at the first location.

3. The method according to claim 1, wherein the historical access information corresponding to the first location comprises first indication information, and the first indication information indicates that a cell is successfully accessed/found at the first location, or the first indication information is used to indicate that no cell is successfully accessed/found at the first location.

4. The method according to claim 1, wherein the historical access information corresponding to the first location comprises second indication information, and the second indication information indicates that a cell is successfully accessed/found at the first location, and indicate one or more cells found at the first location.

5. The method according to claim 1, wherein the historical access information corresponding to the first location comprises third indication information, and the third indication information indicates that a cell is successfully accessed/found at the first location, and indicate one or more cells successfully accessed at the first location.

6. The method according to claim 1, wherein the historical access information corresponding to the first location comprises fourth indication information, the fourth indication information indicates that a cell is successfully accessed/found at the first location, and indicate one or more cells successfully accessed/found at the first location and related information of the one or more successfully accessed/found cells, and the related information of the cell comprises a carrier frequency of the cell.

7. A computer-readable storage medium, wherein the computer-readable storage medium stores a computer program, the computer program comprises a program instruction, and when the program instruction is executed by a computer, the computer is enabled to perform the method according to claim 1.

8. A communications apparatus, comprising a processor and a transceiver, wherein
   the transceiver is configured to obtain first information before searching for a cell at a first location, wherein the first information comprises historical access information that is obtained from one or more second terminals near the communications apparatus in a short-distance communication manner and that corresponds to each second terminal at the first location, wherein historical access information corresponding to the first location indicates whether there is a cell at the first location;
   the processor is configured to determine a value of a search parameter of the communications apparatus at the first location based on second information, wherein the second information comprises the first information; and
   the transceiver searches for a cell at the first location based on the value of the search parameter.

9. The apparatus according to claim 8, wherein the second information further comprises historical access information that is stored by the communications apparatus and that corresponds to the communications apparatus at the first location.

10. The apparatus according to claim 8, wherein the historical access information corresponding to the first location comprises first indication information, and the first indication information indicates that a cell is successfully accessed/found at the first location, or the first indication information is used to indicate that no cell is successfully accessed/found at the first location.

11. The apparatus according to claim 8, wherein the historical access information corresponding to the first location comprises second indication information, and the second indication information indicates that a cell is successfully accessed/found at the first location, and indicate one or more cells found at the first location.

12. The apparatus according to claim 8, wherein the historical access information corresponding to the first location comprises third indication information, and the third indication information indicates that a cell is successfully accessed/found at the first location, and indicate one or more cells successfully accessed at the first location.

13. The apparatus according to claim 8, wherein the historical access information corresponding to the first location comprises fourth indication information, the fourth indication information indicates that a cell is successfully accessed/found at the first location, and indicate one or more cells successfully accessed/found at the first location and related information of the one or more successfully accessed/found cells, and the related information of the cell comprises a carrier frequency of the cell.

14. The apparatus according to claim 8, wherein the search parameter comprises at least one of a search carrier frequency parameter, a location change threshold parameter, a parameter of a maximum quantity of search times, or a search period parameter, and
the transceiver is configured to search for a cell based on a value of the search carrier frequency parameter;
when a quantity of times of searching for a cell by the transceiver at a location is equal to a value of the parameter of the maximum quantity of search times, the processor is configured to determine that there is no cell at the location; and
when the communications apparatus is displaced and a displacement amount is greater than or equal to a value of the location change threshold parameter, the transceiver is configured to re-search for a cell at a location of the communications apparatus after the displacement and re-collects statistics about a quantity of cell search times, wherein
when the transceiver searches for a cell at a location, a time interval between a moment at which a previous search ends and a moment at which a current search starts is a value of the search period parameter.

15. The apparatus according to claim 8, wherein determining the value of a search parameter of the communications apparatus at the first location based on the second information by the processor comprises:
adjusting, based on the second information, a value/values of one or more of search parameters used to search for a cell at the first location, to obtain the value of the search parameter of the communications apparatus at the first location.

16. The apparatus according to claim 15, wherein determining the value of the search parameter of the communications apparatus at the first location based on the second information by the processor comprises:
when the second information indicates that there is a cell at the first location, the processor determines that the value of the search parameter at the first location is a first search parameter value; and, wherein
determining that the value of the search parameter at the first location is a first search parameter value by the processor comprises: decreasing the value of the search period parameter in the search parameter, and/or increasing the value of the parameter of the maximum quantity of search times in the search parameter.

17. The apparatus according to claim 15, wherein access reference information corresponding to the first location comprises the fourth indication information, the fourth indication information indicates that a cell is successfully accessed/found at the first location, and indicate the one or more cells successfully accessed/found at the first location and the related information of the one or more successfully accessed/found cells, and the related information of the cell comprises the carrier frequency of the cell;
adjusting, based on the second information, the value/values of one or more of the search parameters comprises:
when the second information indicates that there is a cell at the first location, determining that the value of the search parameter at the first location is the first search parameter value; and
determining that the value of the search parameter at the first location is the first search parameter value by the processor comprises:
adjusting the value of the search carrier frequency parameter comprised in the search parameter to a value/values of the carrier frequency/carrier frequencies of the one or more cells that are successfully accessed/found at the first location and that are indicated in the fourth indication information.

18. The apparatus according to claim 15, wherein access reference information corresponding to the first location comprises the fourth indication information, the fourth indication information is used to indicate that a cell is successfully accessed/found at the first location, and indicate the one or more cells successfully accessed/found at the first location and the related information of the one or more successfully accessed/found cells, and the related information of the cell comprises the carrier frequency of the cell; and
adjusting, based on the second information, the value/values of one or more of the search parameters comprises:
decreasing the value of the location change threshold in the search parameter when the second information indicates that a value of a carrier frequency of a first cell successfully accessed/found at the first location is greater than or equal to a first preset value; or
increasing the value of the location change threshold in the search parameter when the second information indicates that a value of a carrier frequency of a first cell successfully accessed/found at the first location is less than a second preset value.

19. The apparatus according to claim 15, wherein determining the value of a search parameter of the communications apparatus at the first location based on second information by the processor comprises:
when the second information indicates that there is no cell at the first location, increasing the value of the search period parameter in the plurality of search parameters, and/or decreasing the value of the parameter of the maximum quantity of search times in the plurality of search parameters, to determine that the value of the search parameter of the communications apparatus at the first location is a second search parameter value.

20. The apparatus according to claim 8, wherein the transceiver is further configured to:
- broadcast and/or store a search result under the control of the processor after searching for a cell based on the value of the search parameter, wherein the search result is used to indicate information about the cell successfully accessed/found at the first location, or the search result is used to indicate that no cell is found at the first location.

* * * * *